US012639002B2

(12) United States Patent
Ke et al.

(10) Patent No.: US 12,639,002 B2
(45) Date of Patent: May 26, 2026

(54) MEMORY DEVICE AND OPERATION METHOD THEREOF

(71) Applicant: YANGTZE MEMORY TECHNOLOGIES CO., LTD., Wuhan (CN)

(72) Inventors: Ke Ke, Wuhan (CN); Chenhui Li, Wuhan (CN); Zhipeng Dong, Wuhan (CN); Xiangnan Zhao, Wuhan (CN); Hongtao Liu, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 136 days.

(21) Appl. No.: 18/611,329

(22) Filed: Mar. 20, 2024

(65) Prior Publication Data

US 2025/0291508 A1     Sep. 18, 2025

(30) Foreign Application Priority Data

Mar. 15, 2024     (CN) .......................... 202410302548.5

(51) Int. Cl.
*G06F 3/06*          (2006.01)
(52) U.S. Cl.
CPC .......... *G06F 3/0655* (2013.01); *G06F 3/0604* (2013.01); *G06F 3/0679* (2013.01)

(58) Field of Classification Search
CPC ................................ G11C 16/10; G11C 16/30
See application file for complete search history.

(56) References Cited

U.S. PATENT DOCUMENTS

| | | | |
|---|---|---|---|
| 9,129,696 B2 * | 9/2015 | Joo ...................... | G11C 11/5642 |
| 2020/0294600 A1 * | 9/2020 | Shibuya ................. | G11C 16/32 |
| 2024/0272824 A1 * | 8/2024 | Li .......................... | G11C 16/26 |

* cited by examiner

*Primary Examiner* — Hoai V Ho
*Assistant Examiner* — Anthony Thinh Tang
(74) *Attorney, Agent, or Firm* — BAYES PLLC

(57)          ABSTRACT

In certain aspects, a memory device includes memory cells and a peripheral circuit coupled to the memory cells. The memory cells include a first memory cell coupled to a first word line, a second memory cell coupled to a second word line, and a target memory cell coupled to a third word line adjacent to the first and second word lines. The peripheral circuit is configured to program the target memory cell, perform a first sample read on the first memory cell to obtain a first sample value of the first memory cell, configure one or more verification parameters of the target memory cell based on the first sample value, perform a second sample read on the second memory cell to obtain a second sample value of the second memory cell, and configure one or more read parameters of the target memory cell based on the second sample value.

20 Claims, 22 Drawing Sheets

800

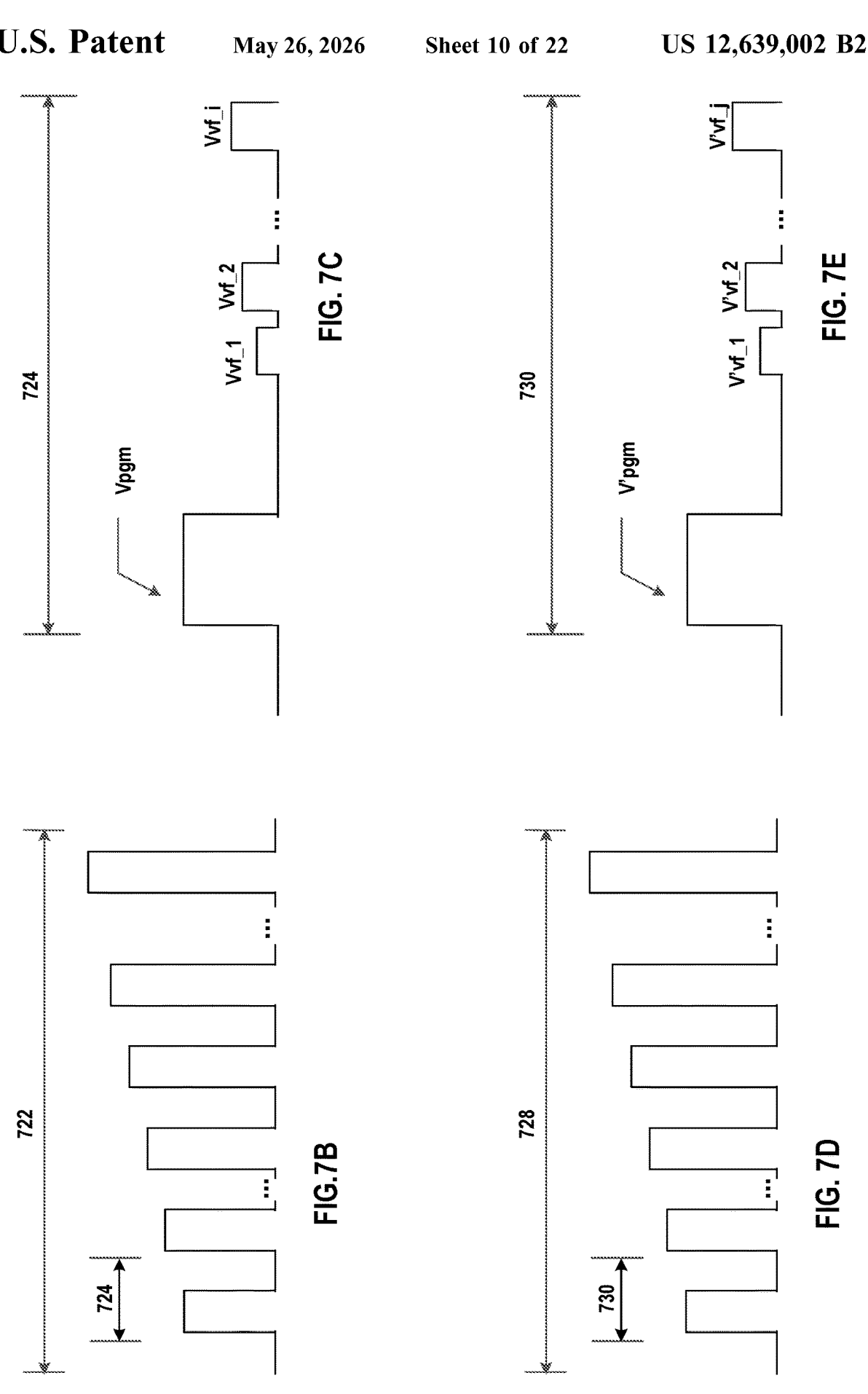

800

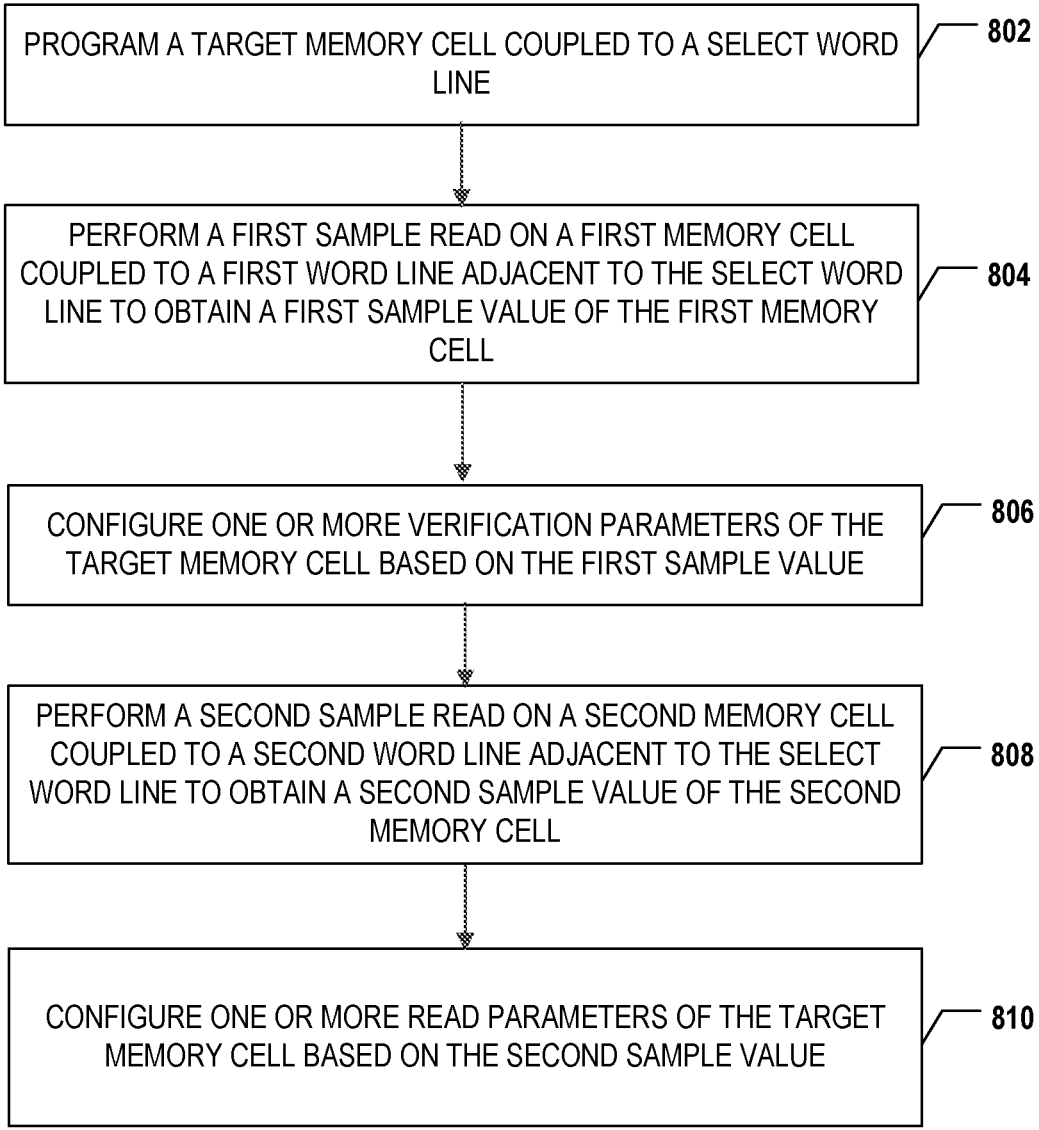

PROGRAM A TARGET MEMORY CELL COUPLED TO A SELECT WORD LINE — 802

PERFORM A FIRST SAMPLE READ ON A FIRST MEMORY CELL COUPLED TO A FIRST WORD LINE ADJACENT TO THE SELECT WORD LINE TO OBTAIN A FIRST SAMPLE VALUE OF THE FIRST MEMORY CELL — 804

CONFIGURE ONE OR MORE VERIFICATION PARAMETERS OF THE TARGET MEMORY CELL BASED ON THE FIRST SAMPLE VALUE — 806

PERFORM A SECOND SAMPLE READ ON A SECOND MEMORY CELL COUPLED TO A SECOND WORD LINE ADJACENT TO THE SELECT WORD LINE TO OBTAIN A SECOND SAMPLE VALUE OF THE SECOND MEMORY CELL — 808

CONFIGURE ONE OR MORE READ PARAMETERS OF THE TARGET MEMORY CELL BASED ON THE SECOND SAMPLE VALUE — 810

FIG. 8

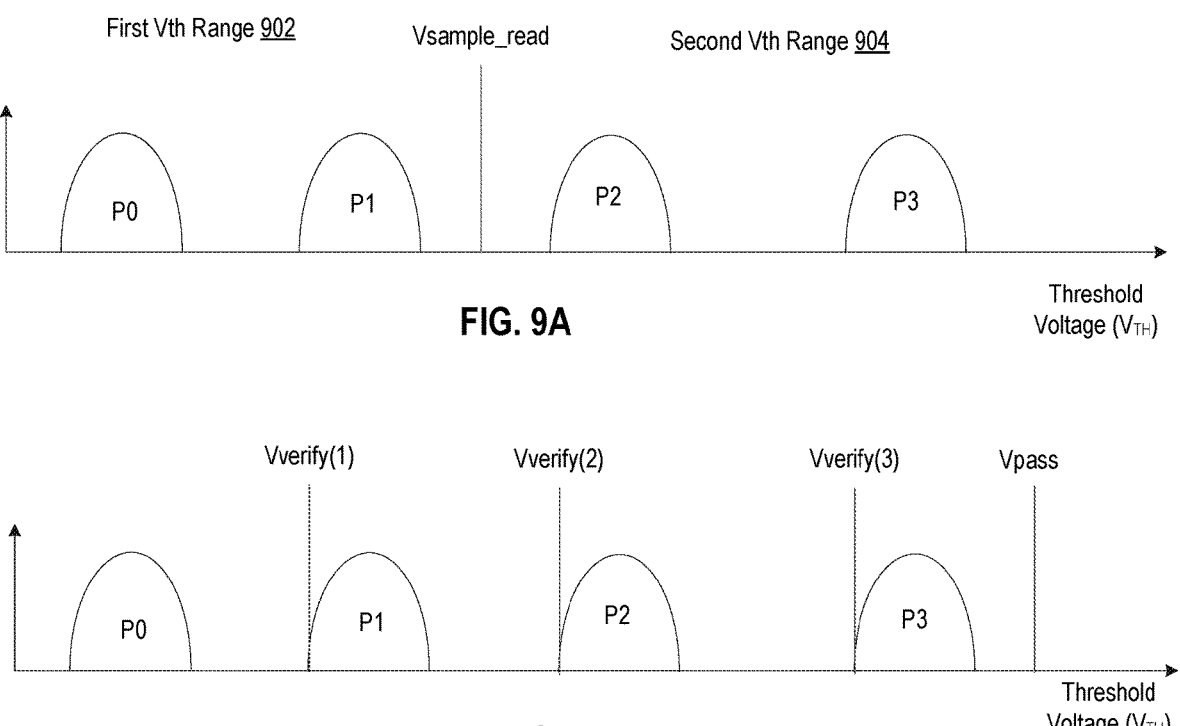

First Vth Range 902    Vsample_read    Second Vth Range 904

P0    P1    P2    P3

Threshold Voltage (V$_{TH}$)

FIG. 9A

Vverify(1)    Vverify(2)    Vverify(3)    Vpass

P0    P1    P2    P3

Threshold Voltage (V$_{TH}$)

FIG. 9B

| TABLE 1 | Program State P1 | Program State P2 | Program State P3 |
|---|---|---|---|
| | Vverify(1) | Vverify(2) | Vverify(3) |
| Default | Vverify(1)_d | Vverify(2)_d | Vverify(3)_d |
| First Sample Value of S0 Corresponding to First Vth Range | Vverify(1)_1 | Vverify(2)_1 | Vverify(3)_1 |
| First Sample Value of S1 Corresponding to Second Vth Range | Vverify(1)_2 | Vverify(2)_2 | Vverify(3)_2 |

FIG. 9C

TABLE 2

| Default | Tso_d |
|---|---|
| First Sample Value of S0 Corresponding to First Vth Range | Tso_1 |
| First Sample Value of S1 Corresponding to Second Vth Range | Tso_2 |

FIG. 9D

TABLE 3

| Default | Vbl_d |
|---|---|
| First Sample Value of S0 Corresponding to First Vth Range | Vbl_1 |
| First Sample Value of S1 Corresponding to Second Vth Range | Vbl_2 |

FIG. 9E

TABLE 4

| Default | Vpass_d |
|---|---|
| First Sample Value of S0 Corresponding to First Vth Range | Vpass_1 |
| First Sample Value of S1 Corresponding to Second Vth Range | Vpass_2 |

FIG. 9F

TABLE 5

| | First Sample Value of S0 Corresponding to First Vth Range | First Sample Value of S1 Corresponding to Second Vth Range |
|---|---|---|
| Bias Level Voltage | Higher | Lower |
| SO Development Time | Longer | Shorter |
| Pass-Through Voltage | Higher | Lower |
| Verification Voltage | Higher | Lower |

FIG. 9G

TABLE 6

|  | Vread(1) | Vread(2) | Vread(3) |
|---|---|---|---|
| Default | Vread(1)_d | Vread(2)_d | Vread(3)_d |
| Second Sample Value of S0 Corresponding to Third Vth Range | Vread(1)_1 | Vread(2)_1 | Vread(3)_1 |
| Second Sample Value of S1 Corresponding to Fourth Vth Range | Vread(1)_2 | Vread(2)_2 | Vread(3)_2 |

TABLE 7

| Default | Tso'_d |
|---|---|
| Second Sample Value of S0 Corresponding to Third Vth Range | Tso'_1 |
| Second Sample Value of S1 Corresponding to Fourth Vth Range | Tso'_2 |

FIG. 10D

TABLE 8

| Default | Vbl'_d |
|---|---|
| Second Sample Value of S0 Corresponding to Third Vth Range | Vbl'_1 |
| Second Sample Value of S1 Corresponding to Fourth Vth Range | Vbl'_2 |

FIG. 10E

TABLE 9

| Default | Vpass'_d |
|---|---|
| Second Sample Value of S0 Corresponding to Third Vth Range | Vpass'_1 |
| Second Sample Value of S1 Corresponding to Fourth Vth Range | Vpass'_2 |

FIG. 10F

TABLE 10

| | Second Sample Value of S0 Corresponding to Third Vth Range | Second Sample Value of S1 Corresponding to Fourth Vth Range |
|---|---|---|
| Bias Level Voltage | Lower | Higher |
| S0 Development Time | Shorter | Longer |
| Pass-Through Voltage | Lower | Higher |
| Read Voltage | Lower | Higher |

FIG. 10G

MEMORY DEVICE AND OPERATION METHOD THEREOF

CROSS-REFERENCE TO RELATED APPLICATIONS

This application claims the benefit of priority to Chinese Application No. 202410302548.5, filed on Mar. 15, 2024, which is incorporated herein by reference in its entirety.

BACKGROUND

The present disclosure relates to memory devices and operation methods thereof.

Non-volatile storage devices such as solid-state drives (SSDs), non-volatile memory express (NVMe), embedded multimedia cards (eMMCs), and universal flash storage (UFS) devices, etc., have gained significant popularity in recent years due to their numerous advantages over traditional hard disk drives (HDDs), such as faster read and write speed, durability and reliability, reduced power consumption, silent operation, and smaller form factors. For example, non-volatile storage devices such as SSDs may use NAND Flash memory for non-volatile storage. Various operations can be performed by NAND Flash memory, such as read, program (write), and erase. For NAND Flash memory, an erase operation can be performed at the block level, and a program operation or a read operation can be performed at the page level.

SUMMARY

In one aspect, a method of operating a memory device that includes memory cells is disclosed. The method includes programming a target memory cell coupled to a select word line. The method includes performing a first sample read on a first memory cell coupled to a first word line adjacent to the select word line to obtain a first sample value of the first memory cell. The method includes configuring one or more verification parameters of the target memory cell based on the first sample value. The method further includes performing a second sample read on a second memory cell coupled to a second word line adjacent to the select word line to obtain a second sample value of the second memory cell. The method further includes configuring one or more read parameters of the target memory cell based on the second sample value.

In some implementations, the first word line includes a word line WL(n−1), the select word line includes a word line WL(n), and the second word line includes a word line WL(n+1), where n is an integer with n≥1.

In some implementations, the first sample read is associated with a first set of threshold voltage (Vth) ranges, and the second sample read is associated with a second set of Vth ranges.

In some implementations, the one or more verification parameters include at least one of a set of verification voltages, a first set of sensing node (SO) development times, a first set of pass-through voltages, or a first set of bias level voltages for biasing a voltage of a bit line coupled to the target memory cell.

In some implementations, configuring the one or more verification parameters of the target memory cell based on the first sample value includes responsive to the first sample value corresponding to a first Vth range from the first set of Vth ranges, determining a first verification voltage for the target memory cell based on a target program state of the target memory cell; or, responsive to the first sample value corresponding to a second Vth range from the first set of Vth ranges, determining a second verification voltage for the target memory cell based on the target program state of the target memory cell. A first Vth value in the first Vth range is smaller than a second Vth value in the second Vth range, and a first offset of the first verification voltage relative to a default verification voltage associated with the target program state is greater than a second offset of the second verification voltage relative to the default verification voltage.

In some implementations, configuring the one or more verification parameters of the target memory cell based on the first sample value further includes responsive to the first sample value corresponding to a first Vth range from the first set of Vth ranges, determining a first SO development time for the target memory cell; or, responsive to the first sample value corresponding to a second Vth range from the first set of Vth ranges, determining a second SO development time for the target memory cell. A first Vth value in the first Vth range is smaller than a second Vth value in the second Vth range, and the first SO development time is greater than the second SO development time.

In some implementations, configuring the one or more verification parameters of the target memory cell based on the first sample value further includes responsive to the first sample value corresponding to a first Vth range from the first set of Vth ranges, determining a first pass-through voltage for the target memory cell; or, responsive to the first sample value corresponding to a second Vth range from the first set of Vth ranges, determining a second pass-through voltage for the target memory cell. A first Vth value in the first Vth range is smaller than a second Vth value in the second Vth range, and the first pass-through voltage is greater than the second pass-through voltage.

In some implementations, configuring the one or more verification parameters of the target memory cell based on the first sample value further includes responsive to the first sample value corresponding to a first Vth range from the first set of Vth ranges, determining a first bias level voltage for the target memory cell; or, responsive to the first sample value corresponding to a second Vth range from the first set of Vth ranges, determining a second bias level voltage for the target memory cell. A first Vth value in the first Vth range is smaller than a second Vth value in the second Vth range, and the first bias level voltage is greater than the second bias level voltage.

In some implementations, the one or more read parameters include at least one of a set of read voltages, a second set of SO development times, a second set of pass-through voltages, or a second set of bias level voltages for biasing a voltage of a bit line coupled to the target memory cell.

In some implementations, configuring the one or more read parameters of the target memory cell based on the second sample value includes responsive to the second sample value corresponding to a third Vth range from the second set of Vth ranges, determining a first subset of read voltages for the target memory cell; or, responsive to the second sample value corresponding to a fourth Vth range from the second set of Vth ranges, determining a second subset of read voltages for the target memory cell. A third Vth value in the third Vth range is smaller than a fourth Vth value in the fourth Vth range. For each read voltage in the first subset of read voltages, an offset of the read voltage relative to a respective default read voltage is smaller than an offset of a corresponding one in the second subset of read voltages relative to the respective default read voltage.

In some implementations, configuring the one or more read parameters of the target memory cell based on the second sample value further includes responsive to the second sample value corresponding to a third Vth range from the second set of Vth ranges, determining a third SO development time for the target memory cell; or, responsive to the second sample value corresponding to a fourth Vth range from the second set of Vth ranges, determining a fourth SO development time for the target memory cell. A third Vth value in the third Vth range is smaller than a fourth Vth value in the fourth Vth range, and the third SO development time is smaller than the fourth SO development time.

In some implementations, configuring the one or more read parameters of the target memory cell based on the second sample value further includes responsive to the second sample value corresponding to a third Vth range from the second set of Vth ranges, determining a third pass-through voltage for the target memory cell; or, responsive to the second sample value corresponding to a fourth Vth range from the second set of Vth ranges, determining a fourth pass-through voltage for the target memory cell. A third Vth value in the third Vth range is smaller than a fourth Vth value in the fourth Vth range, and the third pass-through voltage is smaller than the fourth pass-through voltage.

In some implementations, configuring the one or more read parameters of the target memory cell based on the second sample value further includes responsive to the second sample value corresponding to a third Vth range from the second set of Vth ranges, determining a third bias level voltage for the target memory cell; or, responsive to the second sample value corresponding to a fourth Vth range from the second set of Vth ranges, determining a fourth bias level voltage for the target memory cell. A third Vth value in the third Vth range is smaller than a fourth Vth value in the fourth Vth range, and the third bias level voltage is smaller than the fourth bias level voltage.

In some implementations, the memory device includes a NAND Flash memory device.

In some implementations, the target memory cell, the first memory cell, and the second memory cell are coupled to an identical bit line of the memory device.

In another aspect, a memory device includes memory cells and a peripheral circuit coupled to the memory cells. The memory cells include a first memory cell coupled to a first word line, a second memory cell coupled to a second word line, and a target memory cell coupled to a third word line which is adjacent to the first word line and the second word line. The peripheral circuit is configured to program the target memory cell, perform a first sample read on the first memory cell to obtain a first sample value of the first memory cell, configure one or more verification parameters of the target memory cell based on the first sample value, perform a second sample read on the second memory cell to obtain a second sample value of the second memory cell, and configure one or more read parameters of the target memory cell based on the second sample value.

In some implementations, the first word line includes a word line WL(n−1), the third word line includes a word line WL(n), and the second word line includes a word line WL(n+1), where n is an integer with n≥1.

In some implementations, the first sample read is associated with a first set of Vth ranges, and the second sample read is associated with a second set of Vth ranges.

In some implementations, the one or more verification parameters include at least one of a set of verification voltages, a first set of SO development times, a first set of pass-through voltages, or a first set of bias level voltages for biasing a voltage of a bit line coupled to the target memory cell.

In some implementations, to configure the one or more verification parameters of the target memory cell based on the first sample value, the peripheral circuit is further configured to responsive to the first sample value corresponding to a first Vth range from the first set of Vth ranges, determine a first verification voltage for the target memory cell based on a target program state of the target memory cell; or, responsive to the first sample value corresponding to a second Vth range from the first set of Vth ranges, determine a second verification voltage for the target memory cell based on the target program state of the target memory cell. A first Vth value in the first Vth range is smaller than a second Vth value in the second Vth range. A first offset of the first verification voltage relative to a default verification voltage associated with the target program state is greater than a second offset of the second verification voltage relative to the default verification voltage.

In some implementations, to configure the one or more verification parameters of the target memory cell based on the first sample value, the peripheral circuit is further configured to responsive to the first sample value corresponding to a first Vth range from the first set of Vth ranges, determine a first SO development time for the target memory cell; or, responsive to the first sample value corresponding to a second Vth range from the first set of Vth ranges, determine a second SO development time for the target memory cell. A first Vth value in the first Vth range is smaller than a second Vth value in the second Vth range, and the first SO development time is greater than the second SO development time.

In some implementations, to configure the one or more verification parameters of the target memory cell based on the first sample value, the peripheral circuit is further configured to responsive to the first sample value corresponding to a first Vth range from the first set of Vth ranges, determine a first pass-through voltage for the target memory cell; or, responsive to the first sample value corresponding to a second Vth range from the first set of Vth ranges, determine a second pass-through voltage for the target memory cell. A first Vth value in the first Vth range is smaller than a second Vth value in the second Vth range, and the first pass-through voltage is greater than the second pass-through voltage.

In some implementations, to configure the one or more verification parameters of the target memory cell based on the first sample value, the peripheral circuit is further configured to responsive to the first sample value corresponding to a first Vth range from the first set of Vth ranges, determine a first bias level voltage for the target memory cell; or, responsive to the first sample value corresponding to a second Vth range from the first set of Vth ranges, determine a second bias level voltage for the target memory cell. A first Vth value in the first Vth range is smaller than a second Vth value in the second Vth range, and the first bias level voltage is greater than the second bias level voltage.

In some implementations, the one or more read parameters include at least one of a set of read voltages, a second set of SO development times, a second set of pass-through voltages, or a second set of bias level voltages for biasing a voltage of a bit line coupled to the target memory cell.

In some implementations, to configure the one or more read parameters of the target memory cell based on the second sample value, the peripheral circuit is further configured to responsive to the second sample value corresponding to a third Vth range from the second set of Vth ranges, determine a first subset of read voltages for the target memory cell; or, responsive to the second sample value corresponding to a fourth Vth range from the second set of Vth ranges, determine a second subset of read voltages for the target memory cell. A third Vth value in the third Vth range is smaller than a fourth Vth value in the fourth Vth range. For each read voltage in the first subset of read voltages, an offset of the read voltage relative to a respective default read voltage is smaller than an offset of a corresponding one in the second subset of read voltages relative to the respective default read voltage.

In some implementations, to configure the one or more read parameters of the target memory cell based on the second sample value, the peripheral circuit is further configured to responsive to the second sample value corresponding to a third Vth range from the second set of Vth ranges, determine a third SO development time for the target memory cell; or, responsive to the second sample value corresponding to a fourth Vth range from the second set of Vth ranges, determine a fourth SO development time for the target memory cell. A third Vth value in the third Vth range is smaller than a fourth Vth value in the fourth Vth range, and the third SO development time is smaller than the fourth SO development time.

In some implementations, to configure the one or more read parameters of the target memory cell based on the second sample value, the peripheral circuit is further configured to responsive to the second sample value corresponding to a third Vth range from the second set of Vth ranges, determine a third pass-through voltage for the target memory cell; or, responsive to the second sample value corresponding to a fourth Vth range from the second set of Vth ranges, determine a fourth pass-through voltage for the target memory cell. A third Vth value in the third Vth range is smaller than a fourth Vth value in the fourth Vth range, and the third pass-through voltage is smaller than the fourth pass-through voltage.

In some implementations, to configure the one or more read parameters of the target memory cell based on the second sample value, the peripheral circuit is further configured to responsive to the second sample value corresponding to a third Vth range from the second set of Vth ranges, determine a third bias level voltage for the target memory cell; or, responsive to the second sample value corresponding to a fourth Vth range from the second set of Vth ranges, determine a fourth bias level voltage for the target memory cell. A third Vth value in the third Vth range is smaller than a fourth Vth value in the fourth Vth range, and the third bias level voltage is smaller than the fourth bias level voltage.

In some implementations, the memory device includes a NAND Flash memory device.

In some implementations, the target memory cell, the first memory cell, and the second memory cell are coupled to an identical bit line of the memory device.

In still another aspect, a system includes a memory device configured to store data and a memory controller coupled to the memory device and configured to control an operation of the memory device. The memory device includes memory cells and a peripheral circuit coupled to the memory cells. The memory cells include a first memory cell coupled to a first word line, a second memory cell coupled to a second word line, and a target memory cell coupled to a third word line which is adjacent to the first word line and the second word line. The peripheral circuit is configured to program the target memory cell, perform a first sample read on the first memory cell to obtain a first sample value of the first memory cell, configure one or more verification parameters of the target memory cell based on the first sample value, perform a second sample read on the second memory cell to obtain a second sample value of the second memory cell, and configure one or more read parameters of the target memory cell based on the second sample value.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIGS. 7B-7C illustrate a waveform of word line voltages applied to a select word line in a coarse program pass, according to some examples of the present disclosure.

FIGS. 7D-7E illustrate a waveform of word line voltages applied to a select word line in a fine program pass, according to some examples of the present disclosure.

FIG. 8 illustrates a flowchart of a method for operating a memory device, according to some aspects of the present disclosure.

FIGS. 9A-9G illustrate an example implementation of an assisted verification scheme, according to some aspects of the present disclosure.

FIGS. 10A-10G illustrate an example implementation of an assisted read scheme, according to some aspects of the present disclosure.

Figure 1:
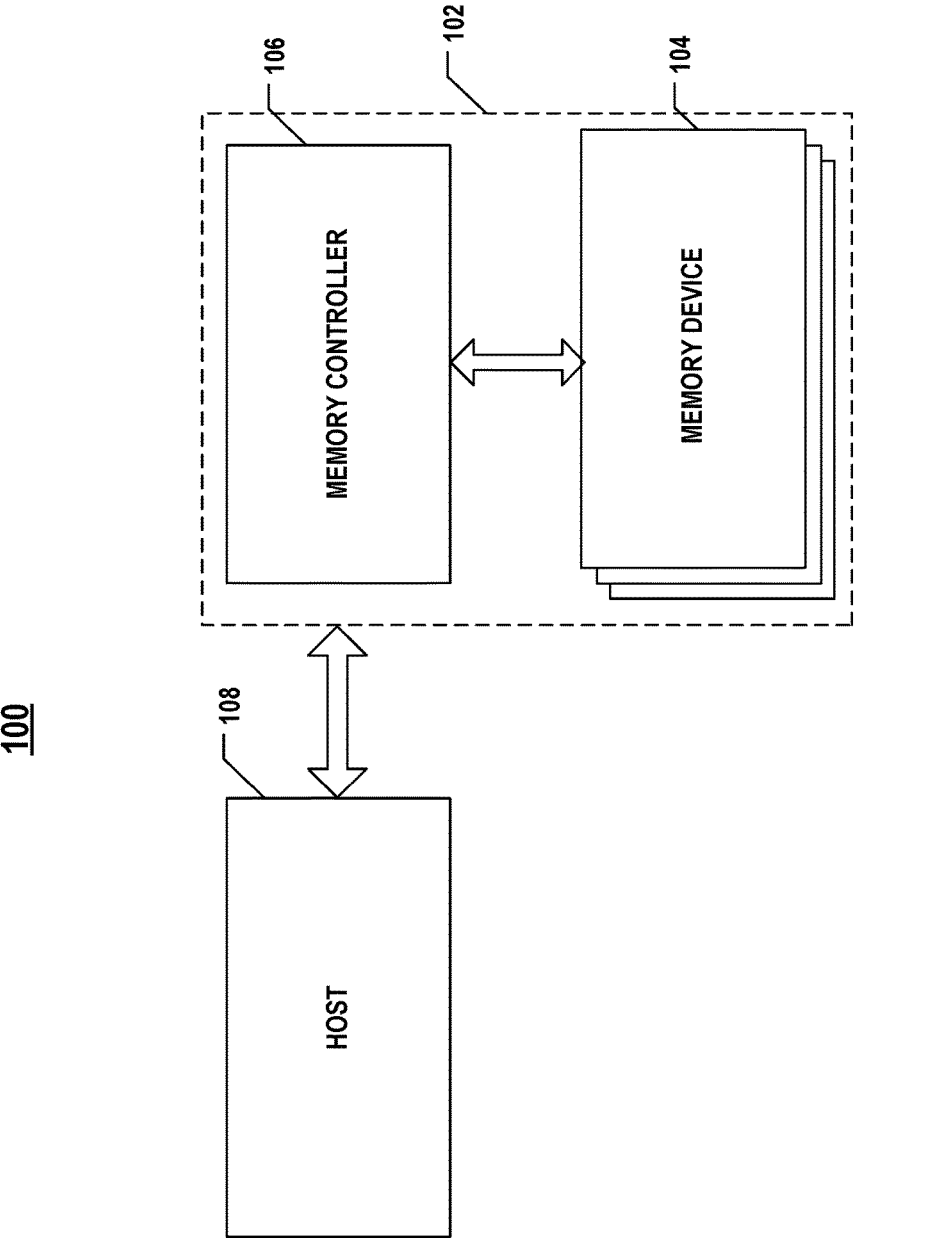
FIG. 1 illustrates a block diagram of a system having a memory device, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Memory cells in a nonvolatile (NV) memory device, such as a NAND Flash memory device may be programmed to respective target program states at the page/word line level. After retention, lateral charge migration may occur to the memory cells due to Vth differences between memory cells on adjacent word lines. The lateral charge migration may lead to severe margin loss on Vth distributions of the memory cells. Taking memory cells on a particular word line as an example, different program states of adjacent memory cells on adjacent word lines may affect the margin loss of the memory cells on the particular word line after retention. Consistent with the scope of the present disclosure, for a particular memory cell coupled to a particular word line, an adjacent memory cell can be a first memory cell (a) coupled to the same bit line as the particular memory cell and also (b) coupled to a first word line adjacent to the particular word line. Alternatively, the adjacent memory cell can be a second memory cell (a) coupled to the same bit line as the particular memory cell and also (b) coupled to a second word line adjacent to the particular word line. The particular word line is between the first and second word lines.

For example, a NAND Flash memory device may include quad-level cells (QLCs) having an erased state (P0) or any one of the program states P1-P15. Assuming that a memory cell $X_n$ on a word line WL(n) may be programmed into a particular target program state Pt (e.g., Pt can be any one of P0-P15, and n can be a positive integer). The memory cell $X_n$ on the word line WL(n), a first adjacent memory cell $X_{n-1}$ on an adjacent word line WL(n−1), and a second adjacent memory cell $X_{n+1}$ on an adjacent word line WL(n+1) may be coupled to the same bit line. If the memory cell $X_n$ has a low program state, such as P1, whereas the first and second adjacent memory cells $X_{n-1}$ and $X_{n+1}$ have a high program state, such as P15, the memory cell $X_n$ may have a charge gain due to lateral charge migration after retention. However, if the memory cell $X_n$ has a high program state, such as P15, whereas the first and second adjacent memory cells $X_{n-1}$ and $X_{n+1}$ have a low program state, such as P1, the memory cell $X_n$ may have a charge loss due to the lateral charge migration. In either case, a threshold voltage (Vth) of the memory cell $X_n$ may be changed after retention.

Figure 12A:
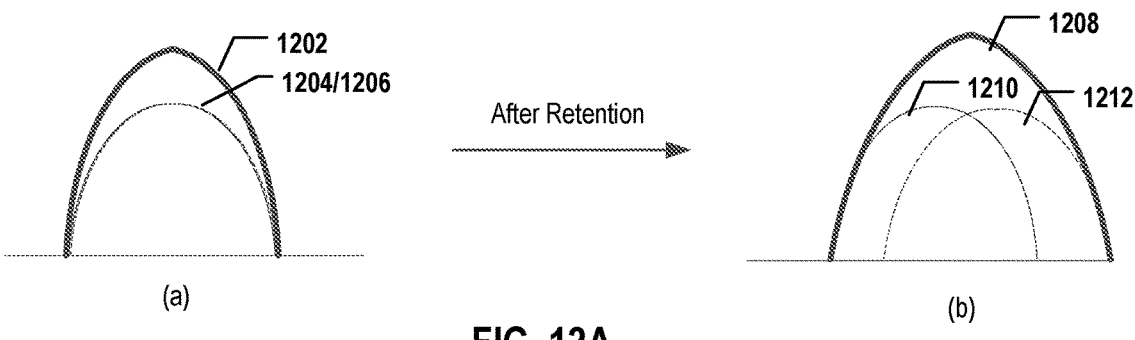
FIG. 12A illustrates changes in Vth distributions of memory cells after data retention, according to some examples.

In another example, with reference to FIG. 12A, a memory device can be a NAND Flash memory device including QLCs having an erased state (P0) or any one of the program states P1-P15. Initially, for memory cells that have a particular target program state, if their adjacent memory cells have low threshold voltages (Vths) corresponding to low program states (e.g., P0-P7), a first Vth distribution of the memory cells can be illustrated using a curve 1204, as shown in section (a) of FIG. 12A. If the adjacent memory cells have high Vths corresponding to high program states (e.g., P8-P15), a second Vth distribution of the memory cells can be illustrated using a curve 1206, as shown in section (a) of FIG. 12A. Curves 1204 and 1206 are consistent with each other, indicating that the first and second Vth distributions of the memory cells are the same. No charge migration has occurred yet, and different program states of the adjacent memory cells have not affected the margin loss of the memory cells yet. A third Vth distribution of the memory cells, which is a summation of the first and second distributions, can be illustrated using a curve 1202, as shown in section (a) of FIG. 12A.

After retention, curves 1202, 1204, and 1206 are shifted and changed to curves 1208, 1210, and 1212, respectively, as shown in section (b) of FIG. 12A. Curves 1208, 1210, and 1212 are wider than curves 1202, 1204, and 1206, respectively, due to lateral charge migration. That is, compared with section (a) of FIG. 12A, section (b) of FIG. 12A illustrates that each of the first Vth distribution, the second Vth distribution, and the third Vth distribution of the memory cells is shifted and becomes wider. The first Vth distribution is not consistent with the second Vth distribution (e.g., the first Vth distribution only partially overlaps with the second Vth distribution and is on the left side of the second Vth distribution). Further, the first, second, and third Vth distributions become wider. Thus, a margin loss can be incurred on the Vth distribution of the memory cells.

To address one or more of the aforementioned issues, the present disclosure introduces a margin-improved scheme to enhance the margin on the Vth distributions of memory cells after retention so that the performance of NAND Flash memory devices can be improved. The margin-improved scheme may include an assisted verification scheme for a program operation, an assisted read scheme for a read operation, or a combination of the assisted verification scheme and the assisted read scheme.

Specifically, a program operation may include cycles of applying program/verify pulses, and each cycle may include (a) a program phase of applying a program pulse to a select word line (e.g., a word line WL(n)) and (b) a verification phase of applying one or more verification pulses to the select word line. In the program phase, the program pulse can be applied to at least a target memory cell coupled to the select word line. During the verification phase, the assisted verification scheme may be applied to a first adjacent word line (e.g., a word line WL(n−1) or WL(n+1)), and configured to determine one or more verification parameters to be applied in the verification phase of the target memory cell on the select word line. Then, a margin loss induced by the lateral charge migration which is caused by different program states of memory cells on the first adjacent word line can be recovered. Additionally or alternatively, during a read operation on the target memory cell, the assisted read scheme can be applied to a second adjacent word line (e.g., the word line WL(n+1) or WL(n−1)), and configured to determine one or more read parameters to be applied in the read operation. Then, a margin loss induced by the lateral charge migration which is caused by different program states of memory cells on the second adjacent word line can be recovered. In some implementations, the first adjacent word line can be the word line WL(n−1), and the second adjacent word line can be the word line WL(n+1). In this case, a margin loss caused by the word line coupling can also be recovered.

Thus, by applying the assisted verification scheme and the assisted read scheme disclosed herein, the margin on the Vth distribution can be improved after retention since the margin loss due to the lateral charge migration can be recovered. The margin improvement of the assisted verification scheme and the margin improvement of the assisted read scheme can be combined together to enhance the performance of the NAND Flash memory devices.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as DRAM devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
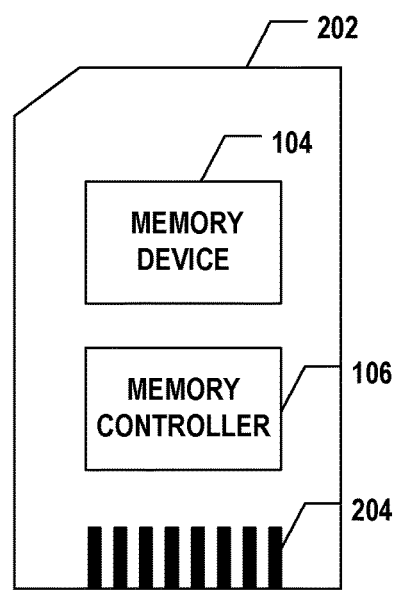
FIG. 2A illustrates a diagram of a memory card having a memory device, according to some aspects of the present disclosure.
Figure 2B:
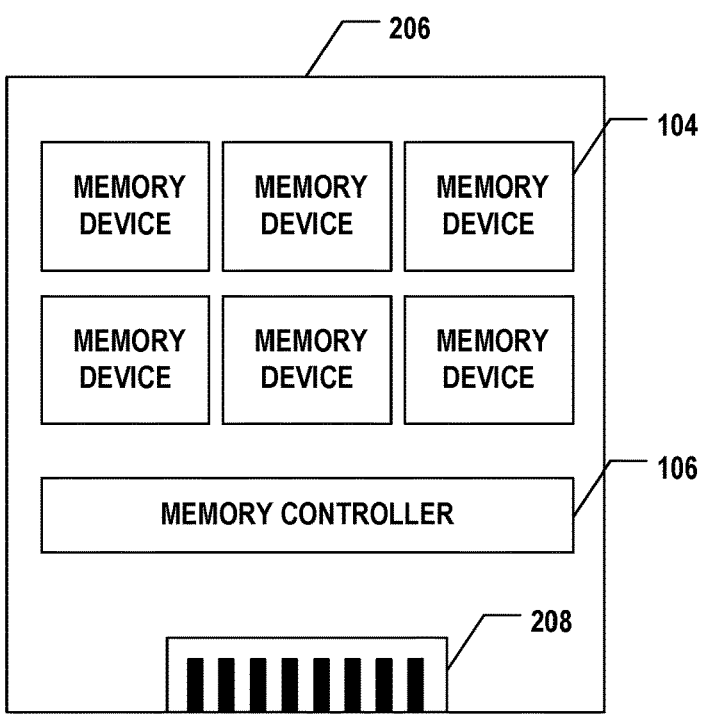
FIG. 2B illustrates a diagram of a solid-state drive (SSD) having a memory device, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
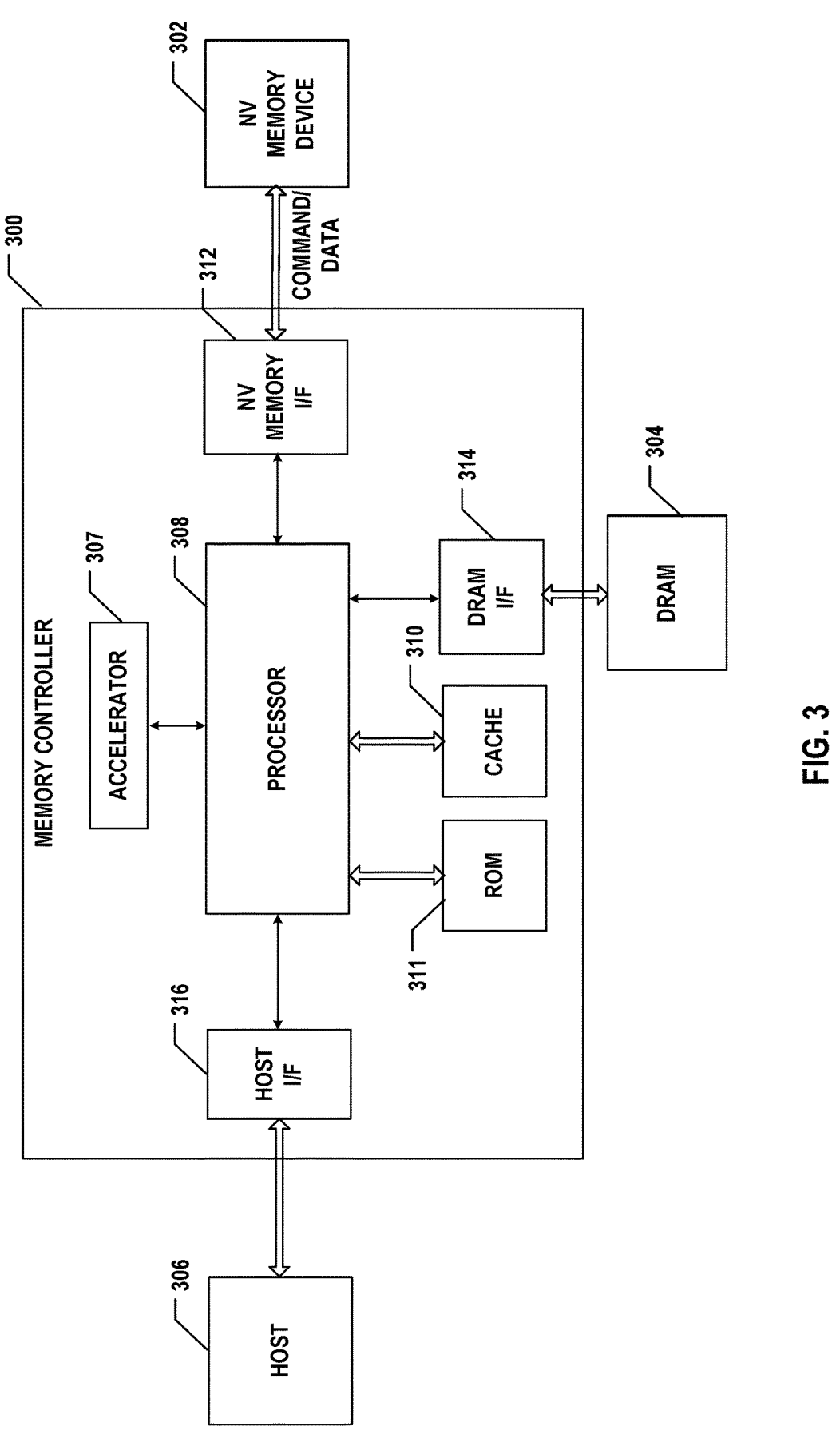
FIG. 3 illustrates a block diagram of a memory controller, according to some aspects of the present disclosure.

FIG. 3 illustrates a block diagram of a memory controller 300, according to some aspects of the present disclosure. Memory controller 300 may be one example of memory controller 106 in FIG. 1. As shown in FIG. 3, memory controller 300 can include a processor 308, an accelerator 307 (e.g., a hardware accelerator), a cache 310, and a read-only memory (ROM) 311. In some implementations, processor 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processor 308. In some implementations, processor 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a non-volatile memory interface 312, a DRAM interface 314, and a host interface 316 operatively coupled to a non-volatile memory device 302 (e.g., flash memory), DRAM 304 (e.g., an example of volatile memory devices), and a host 306 (e.g., an example of host 108), respectively. Non-volatile memory interface 312, DRAM interface 314, and host interface 316 can be configured to transfer data, command, clock, or any suitable signals between processor 308 and non-volatile memory device 302, DRAM 304, and host 306, respectively. Non-volatile memory interface 312, DRAM interface 314, and host interface 316 can implement any suitable communication protocols facilitating data transfer, communication, and management, such as the NVMe protocol and PCI-E protocol, double data rate (DDR) protocol, to name a few.

As described above, both cache 310 and DRAM 304 may be considered volatile memory devices that can be controlled and accessed by memory controller 300 in a memory system. In some implementations, a cache can be implemented as part of volatile memory devices, for example, by an SRAM and/or DRAM 304. It is understood that although FIG. 3 shows that cache 310 is within memory controller 300 and DRAM 304 is outside of memory controller 300, in some examples, both cache 310 and DRAM 304 may be within memory controller 300 or outside of memory controller 300.

Figure 4:
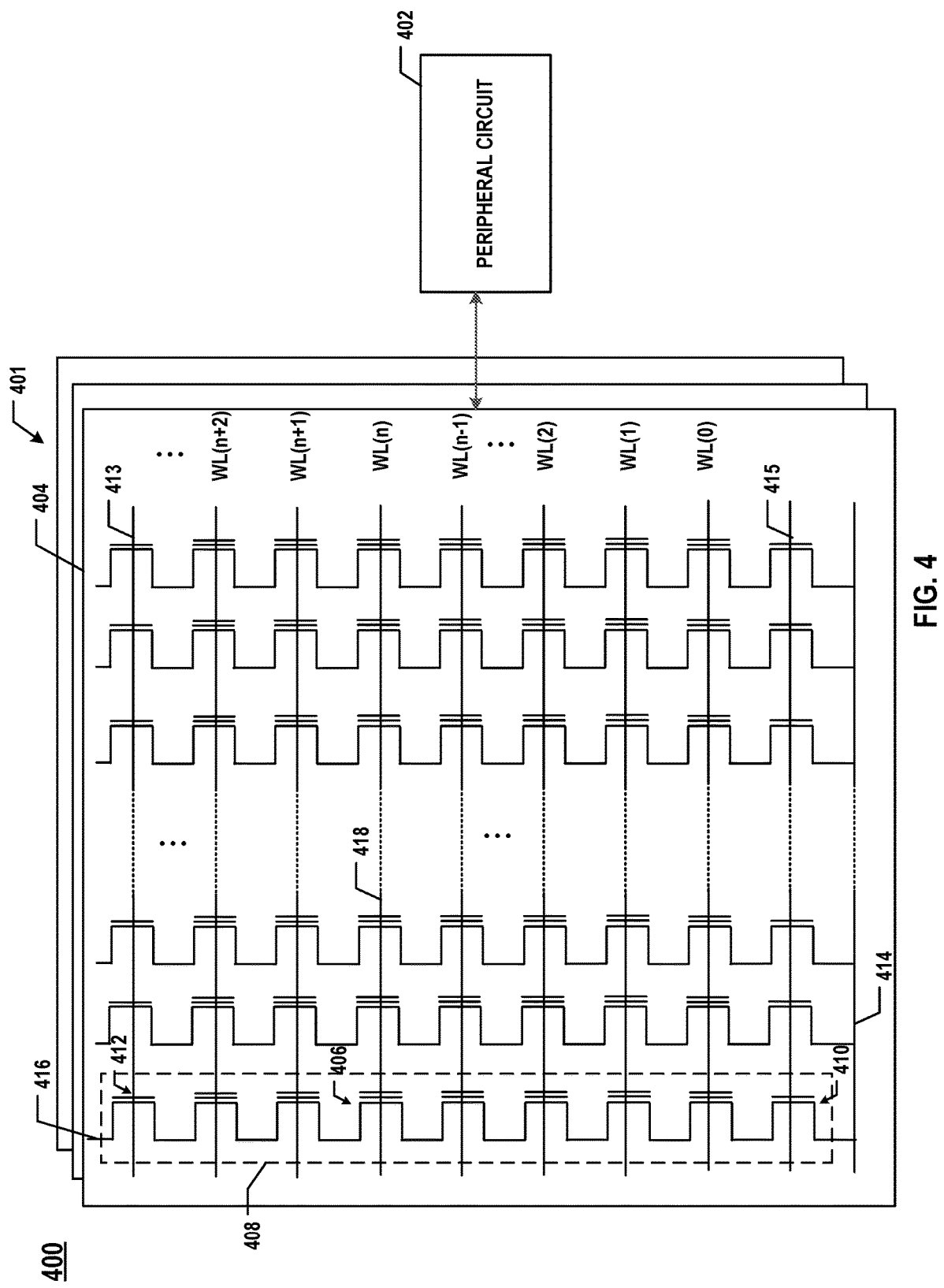
FIG. 4 illustrates a schematic diagram of a memory device including peripheral circuits, according to some aspects of the present disclosure.

FIG. 4 illustrates a schematic diagram of a memory device 400 including peripheral circuits 402, according to some aspects of the present disclosure. Memory device 400 can be an example of memory device 104 in FIG. 1. Memory device 400 can include a memory cell array 401 and peripheral circuits 402 coupled to memory cell array 401. Memory cell array 401 can be a NAND Flash memory cell array in which memory cells 406 are provided in an array of NAND memory strings 408 each extending vertically above a substrate (not shown). In some implementations, each NAND memory string 408 includes a plurality of memory cells 406 coupled in series and stacked vertically. Each memory cell 406 can hold a continuous, analog value, such as an electrical voltage or charge, that depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 406 is a multi-level cell (MLC) that is capable of storing more than a single bit of data in more than four memory states. For example, the MLC can store two bits per cell, three bits per cell (also known as TLC), or four bits per cell (also known as QLC). Each MLC can be programmed to assume a range of possible nominal storage values. In one example, if each MLC stores two bits of data, then the MLC can be programmed to assume one of three possible program levels from an erased state by writing one of three possible nominal storage values to the cell. A fourth nominal storage value can be used for the erased state.

As shown in FIG. 4, each NAND memory string 408 can also include a source select gate (SSG) transistor 410 at its source end and a drain select gate (DSG) transistor 412 at its drain end. SSG transistor 410 and DSG transistor 412 can be configured to activate select NAND memory strings 408 (columns of the array) during read and program operations. In some implementations, the sources of NAND memory strings 408 in the same block 404 are coupled through a same source line (SL) 414, e.g., a common SL. In other words, all NAND memory strings 408 in the same block 404 have an array common source (ACS), according to some implementations. The drain of each NAND memory string 408 is coupled to a respective bit line 416 from which data can be read or written via an output bus (not shown), according to some implementations. In some implementations, each NAND memory string 408 is configured to be selected or deselected by applying a DSG select voltage or a DSG unselect voltage to the gate of respective DSG transistor 412 through one or more DSG lines 413 and/or by applying an SSG select voltage or an SSG unselect voltage to the gate of respective SSG transistor 410 through one or more SSG lines 415.

As shown in FIG. 4, NAND memory strings 408 can be organized into multiple blocks 404, each of which can have a common source line 414, e.g., coupled to an ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive voltage (e.g., 20 V or more). Memory cells 406 of adjacent NAND memory strings 408 can be coupled through word lines 418 that select which row of memory cells 406 is affected by read and program operations. Each word line 418 can include a plurality of control gates (gate electrodes) at each memory cell 406 coupled to word line 418 and a gate line coupling the control gates. With reference to FIG. 4, a plurality of word lines WL(0), WL(1), WL(2), . . . , WL(n−1), WL(n), WL(n+1), and WL(n+2) are illustrated, with n being a positive integer.

Figure 5A:
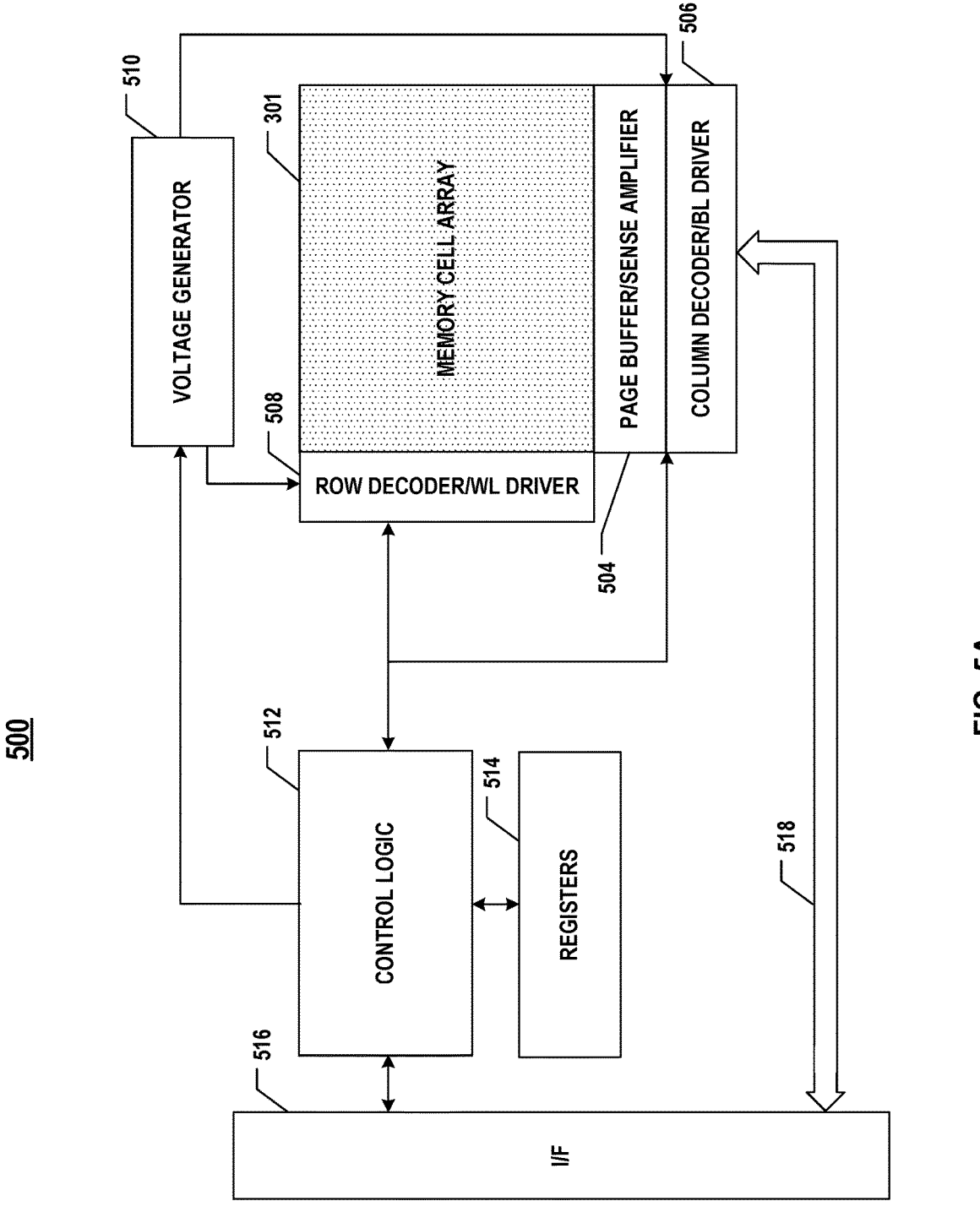
FIG. 5A illustrates a block diagram of a memory device including a memory cell array and peripheral circuits, according to some aspects of the present disclosure.

Peripheral circuits 402 can be coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each target memory cell 406 through bit lines 416, word lines 418, source lines 414, SSG lines 415, and DSG lines 413. Peripheral circuits 402 can include various types of peripheral circuits formed using metal-oxide-semiconductor (MOS) technologies. For example, FIG. 5A illustrates some peripheral circuits including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5A may be included as well.

Page buffer/sense amplifier 504 can be configured to read and program (write) data from and to memory cell array 401 according to the control signals from control logic 512. In one example, page buffer/sense amplifier 504 may store one page of program data (write data) to be programmed into a page of memory cell array 401. In another example, page buffer/sense amplifier 504 may verify programmed target memory cells 406 in each program/verify loop (cycle) in a program operation to ensure that the data has been properly programmed into memory cells 406 coupled to select word lines 418. In still another example, page buffer/sense amplifier 504 may also sense the low power signals from bit line 416 that represents a data bit stored in memory cell 406 and amplify the small voltage swing to recognizable logic levels in a read operation. In program operations, page buffer/sense amplifier 504 can include storage modules (e.g., latches, caches, registers, etc.) for temporarily storing a set of N-bits data (e.g., in the form of gray codes) received from data bus 518 and providing the set of N-bits data to a corresponding target memory cell 406 through the corresponding bit line 416 in each program pass of a multi-pass program operation.

Column decoder/bit line driver 506 can be configured to be controlled by control logic 512 and select one or more NAND memory strings 408 by applying bit line voltages generated from voltage generator 510. Row decoder/word line driver 508 can be configured to be controlled by control logic 512 and select/deselect blocks 404 of memory cell array 401 and select/deselect word lines 418 of block 404. Row decoder/word line driver 508 can be further configured to drive word lines 418 using word line voltages generated from voltage generator 510. In some implementations, row decoder/word line driver 508 can also select/deselect and drive SSG lines 415 and DSG lines 413 as well. Voltage generator 510 can be configured to be controlled by control logic 512 and generate the word line voltages (e.g., read voltage, program voltage, channel pass voltage, local voltage, verify voltage, etc.), bit line voltages, and source line voltages to be supplied to memory cell array 401.

Control logic 512 can be coupled to each peripheral circuit described above and configured to control the operations of each peripheral circuit. Registers 514 can be coupled to control logic 512 and include status registers, command registers, and address registers for storing status information, command operation codes (OP codes), and command addresses for controlling the operations of each peripheral circuit. Interface 516 can be coupled to control logic 512 and act as a control buffer to buffer and relay control commands received from a host (e.g., 108 in FIG. 1) to control logic 512 and status information received from control logic 512 to the host. Interface 516 can also be coupled to column decoder/bit line driver 506 via data bus 518 and act as a data input/output (I/O) interface and a data buffer to buffer and relay the data to and from memory cell array 401.

Figure 5B:
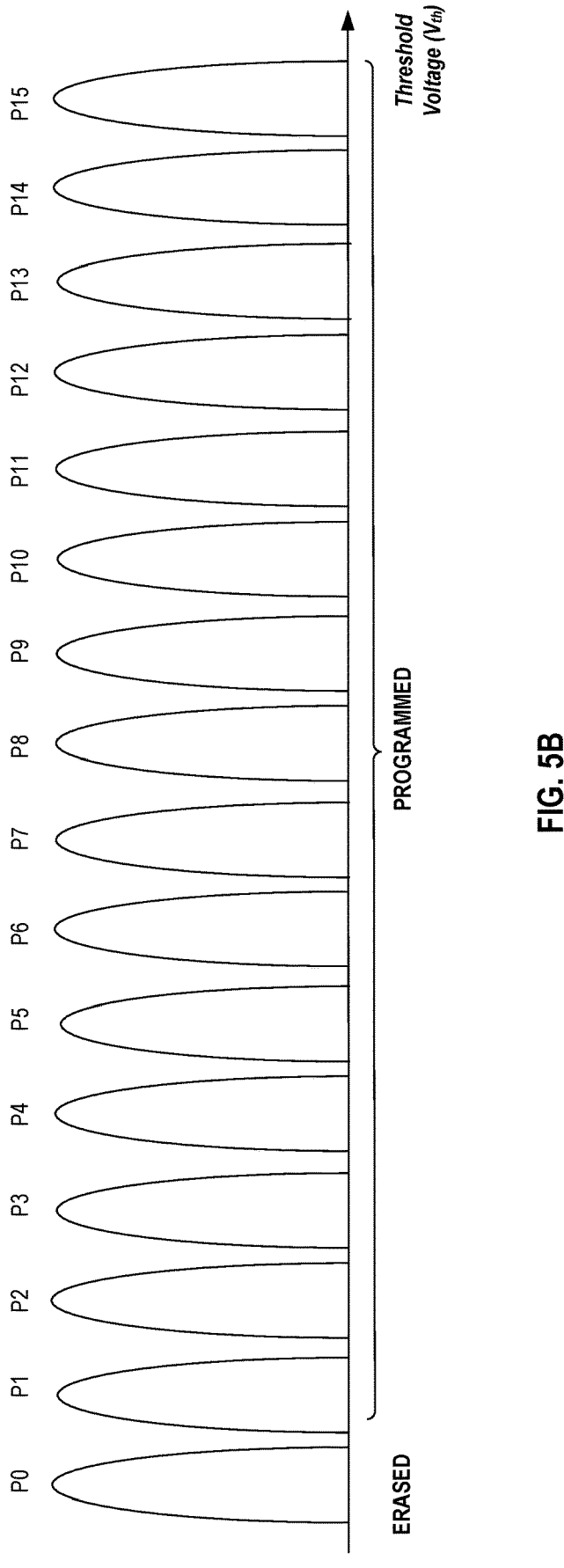
FIG. 5B illustrates Vth distributions of memory cells in a program operation, according to some aspects of the present disclosure.

FIG. 5B illustrates Vth distributions of memory cells in a program operation, according to some aspects of the present disclosure. As described above, each memory cell 406 can be configured to store a set of N-bits data in one of $2^N$ levels, where N is an integer greater than 1 (e.g., N=2 for MLCs, N=3 for TLCs, N=4 for QLCs, etc.). Each level can correspond to one of $2^N$ Vth ranges of memory cells 406. Considering a multi-pass program operation in which memory cell 406 may be programmed into an intermediate level first in a coarse program pass, the "level" referred to herein may be considered as the final level after the fine program pass of the multi-pass program operations, in contrast to the intermediate level. Taking QLCs, where N=4, for example, as shown in FIG. 5B, memory cell 406 may be programmed into one of the 16 levels, including one level of the erased state (P0) and 15 levels of the program states (program states P1-P15). Each level may correspond to a respective Vth range of memory cells 406. For example, the level corresponding to the lowest threshold voltage range (the left-most threshold voltage distribution in FIG. 5B) may be considered as level 0, the level corresponding to the second-lowest threshold voltage range (the second left-most threshold voltage distribution in FIG. 5B) may be considered as level 1, and so until level 15 corresponding to the highest threshold voltage range (the right-most threshold voltage distribution in FIG. 5B).

Figure 6A:
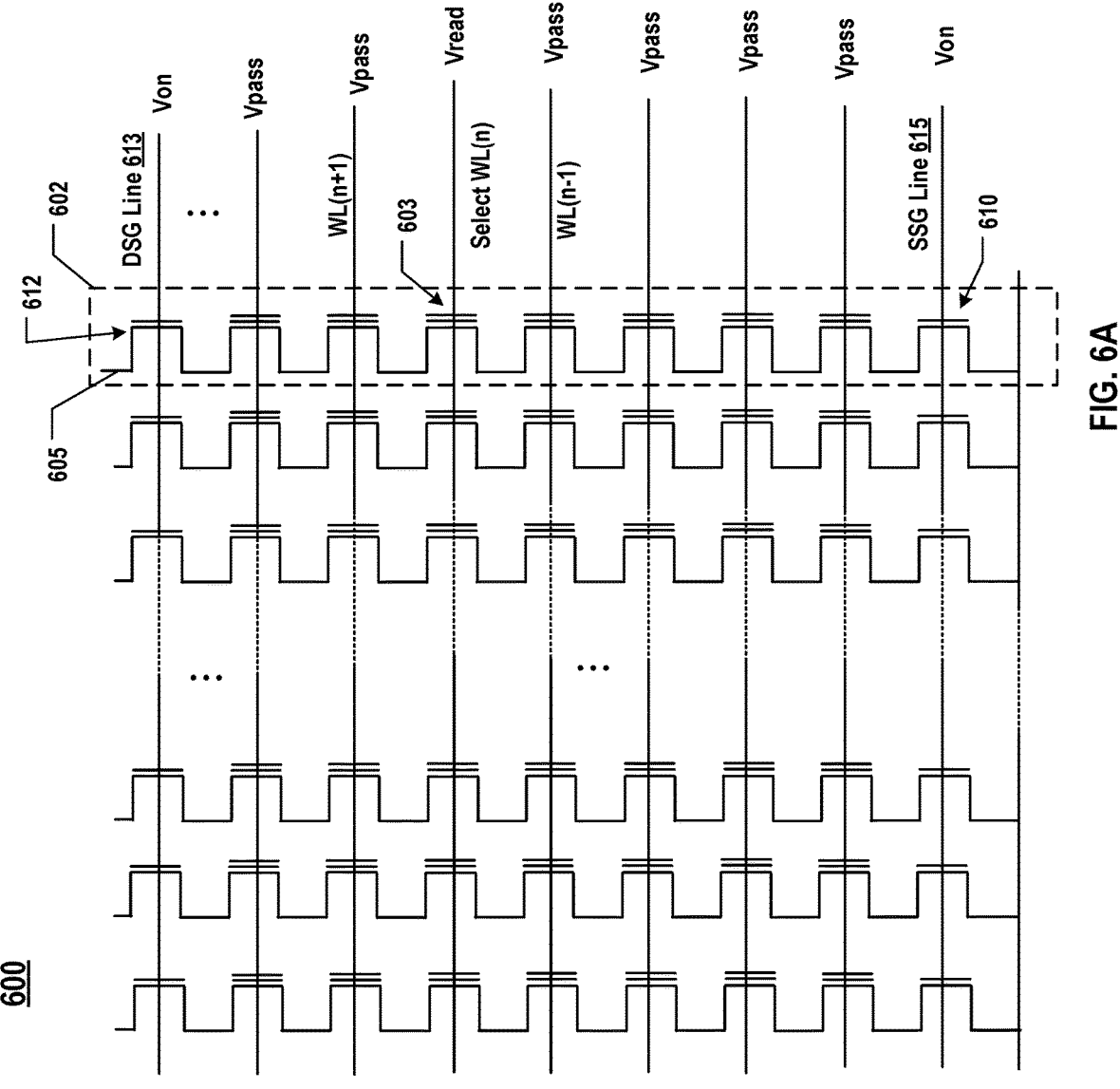
FIGS. 6A-6C illustrate a read operation on a target memory cell, according to some examples.
Figure 6C:
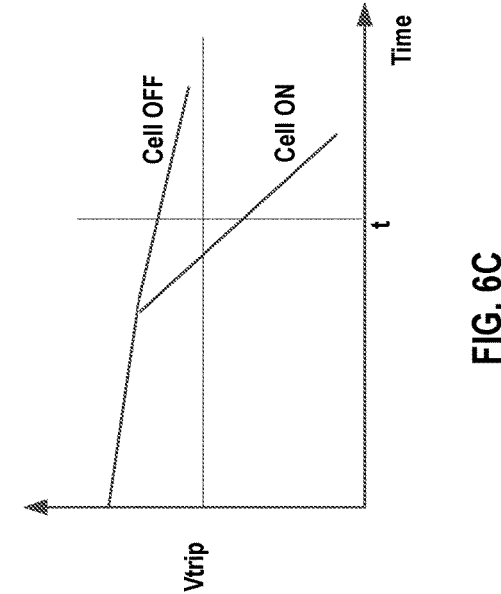
Figure 6B:
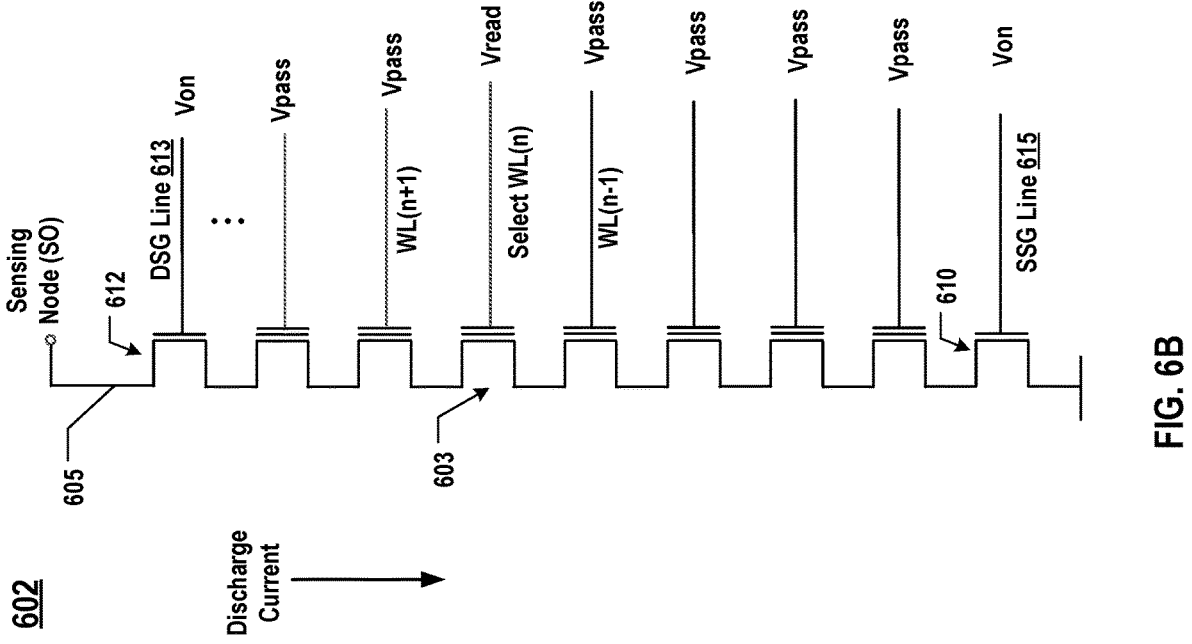

FIGS. 6A-6C illustrate a read operation on a target memory cell, according to some examples. FIGS. 6A-6C are described together herein. Referring to FIG. 6A, a block 600 of memory cells (e.g., block 404) is illustrated, which includes a memory string 602 (e.g., NAND memory string 408). By way of examples, a process of reading data stored in a target memory cell 603 in memory string 602 is illustrated with reference to FIGS. 6A-6C. Target memory cell 603 may be coupled to a select word line WL(n) and a bit line 605. Bit line 605 may be coupled to a sensing node (SO) of a corresponding page buffer circuit in page buffer 504. An example implementation of the page buffer circuit is illustrated below with reference to FIG. 11A or 11B.

To sense a state of target memory cell 603, a DSG select voltage (e.g., Von) can be applied to a gate of a DSG transistor 612 through a DSG line 613, and an SSG select voltage (e.g., Von) can be applied to a gate of an SSG transistor 610 through an SSG line 615. The word line WL(n) can be selected by applying a read voltage Vread to the word line WL(n). Other word lines (e.g., WL(n−1), WL(n+1), etc.) are deselected by applying a pass-through voltage Vpass to the other word lines to ensure that the other memory cells on memory string 602 are switched on (e.g., in the "ON" state). As shown in FIG. 6B, the SO node of the corresponding page buffer circuit may be pre-charged. Bit line 605 may also be pre-charged based on a bias level voltage. For example, the bias level voltage can be used for biasing a voltage of bit line 605. The SO node can be discharged at a discharged rate according to the state of target memory cell 603. When an SO development time "t" has passed, a voltage of the SO node can be compared with a reference voltage "Vtrip" to determine the state of target memory cell 603. For example, when the voltage of the SO node at the SO development time "t" is greater than the reference voltage Vtrip, it is determined that target memory cell 603 is in an "OFF" state, indicating that a Vth of target memory cell 603 is greater than the read voltage Vread. When the voltage of the SO node at the SO development time "t" is smaller than the reference voltage Vtrip, it is determined that target memory cell 603 is in an "ON" state, indicating that the Vth of target memory cell 603 is smaller than the read voltage Vread. Consistent with some aspects of the present disclosure, the SO development time may include a time window during which the SO node is discharged.

Figure 7A:
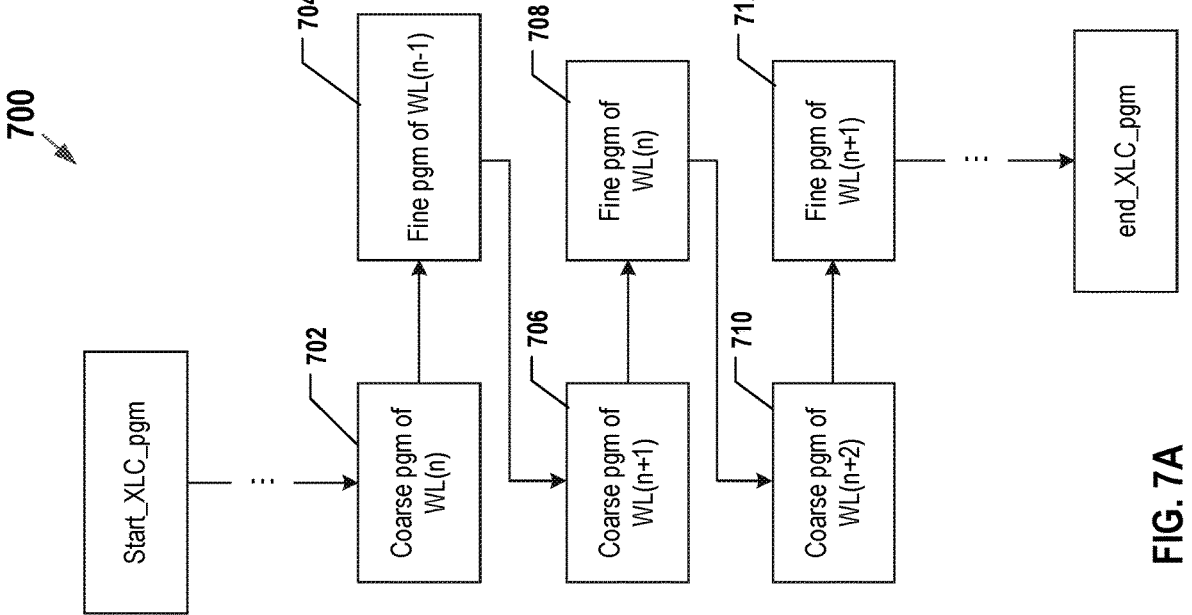
FIG. 7A illustrates a process for performing multi-pass program operations in a memory device, according to some examples.

FIG. 7A illustrates a process 700 for performing multi-pass program operations in a memory device, according to some examples. Process 700 may be executed by peripheral circuits of the memory device (e.g., peripheral circuits 402 of FIG. 4). The multi-pass program operations may be performed with respect to a plurality of word lines (e.g., WL(n−1), WL(n), WL(n+1)), respectively. Taking xLCs (such as TLCs, QLCs, etc.) as examples, a coarse program pass and a fine program pass may be performed with respect to each word line. For example, a coarse program pass 702 associated with the word line WL(n) can be performed. Before coarse program pass 702, a coarse program pass associated with the word line WL(n−1) (not shown in FIG. 7A) can be performed. Following coarse program pass 702, a fine program pass 704 associated with the word line WL(n−1) can be performed. Subsequently, a coarse program pass 706 associated with the word line WL(n+1), a fine program pass 708 associated with the word line WL(n), a coarse program pass 710 associated with the word line WL(n+2), and a fine program pass 712 associated with the word line WL(n+1), and so on and so forth, can be performed sequentially.

FIGS. 7B-7C illustrate a waveform of word line voltages applied to a select word line in a coarse program pass, according to some examples of the present disclosure. For xLCs, a multi-pass program operation can involve a coarse program pass that programs the xLCs to respective ones of the intermediate levels, as well as a fine program pass that programs the xLCs from the intermediate levels to the final levels.

As shown in FIG. 7B, the multi-pass program operation includes at least a coarse program pass 722. Coarse program pass 722 includes one or more program/verify loops (or program/verify cycles). In each program/verify loop, a program voltage is applied to a select word line in the program phase, followed by a number of verification voltages with incremental changes of voltage levels in the verification phase. For example, an initial program/verify loop 724 of coarse program pass 722 is shown in FIGS. 7B-7C. In initial program/verify loop 724, a program voltage (Vpgm_init) is applied to the select word line, followed by a number of verification voltages (Vvf_1, Vvf_2, . . . , Vvf_i), where i is a positive integer (i≥1). Vvf_1 may indicate a verification voltage for the program state P1 in coarse program pass 722. Vvf_2 may indicate a verification voltage for the program state P2 in coarse program pass 722. Similarly, Vvf_i may indicate a verification voltage for the program state Pi in coarse program pass 722. In some implementations, incremental step pulse programming (ISPP) can be applied in coarse program pass 722.

FIGS. 7D-7E illustrate a waveform of word line voltages applied to a select word line in a fine program pass, according to some examples of the present disclosure. In some implementations, the multi-pass program operation further includes a fine program pass 728. Fine program pass 728 may be performed after coarse program pass 722. Fine program pass 728 may also include one or more program/verify loops. In each program/verify loop, a program voltage is applied to the select word line in the program phase, followed by a number of verification voltages with incremental changes of voltage levels in the verification phase. For example, an initial program/verify loop 730 of fine program pass 728 is shown in FIGS. 7D-7E. In initial program/verify loop 730, a program voltage (V'pgm_init) is applied to the select word line, followed by a number of verification voltages (V'vf_1, V'vf_2, . . . , V'vf_j), where j is a positive integer (j≥1). V'vf_1 may indicate a verification voltage for the program state P1 in fine program pass 728. V'vf_2 may indicate a verification voltage for the program state P2 in fine program pass 728. V'vf_j may indicate a verification voltage for the program state Pj in fine program pass 728. In some implementations, ISPP can be applied in fine program pass 728.

Consistent with some aspects of the present disclosure, an assisted verification scheme for a program operation, an assisted read scheme for a read operation, or a combination of the assisted verification scheme and the assisted read scheme can be applied in a memory device to improve the margin on the Vth distribution after retention. As a result, the performance of the memory device can be improved. Example implementations of the assisted verification scheme are provided below with reference to operations 804 and 806 of FIG. 8 and FIGS. 9A-9G, which are described below in more detail. Example implementations of the assisted read scheme are provided below with reference to operations 808 and 810 of FIG. 8 and FIGS. 10A-10G, which are described below in more detail.

FIG. 8 illustrates a flowchart of a method 800 for operating a memory device, according to some aspects of the present disclosure. The memory device may be any suitable memory device disclosed herein, such as memory device 104, 302, or 400. Method 800 may be implemented by peripheral circuits 402, such as control logic 512, row decoder/word line driver 508, and page buffer/sense amplifier 504. It is understood that the operations shown in method 800 may not be exhaustive and that other operations can be performed as well before, after, or between any of the illustrated operations. Further, some of the operations may be performed simultaneously, or in a different order than that shown in FIG. 8.

Without loss of generality, method 800 is described herein with reference to peripheral circuits 402. Operations 802, 804, and 806 may involve performing a program operation on at least a target memory cell coupled to a select word line. Operations 808 and 810 may involve performing a read operation on the target memory cell.

Referring to FIG. 8, method 800 starts at operation 802, in which at least the target memory cell coupled to the select word line may be programmed. For example, peripheral circuits 402 may apply a program voltage to the select word line to program at least the target memory cell. The target memory cell may be configured to be programmed into a particular target program state.

Method 800 proceeds to operation 804, as illustrated in FIG. 8, in which a first sample read can be performed on a first memory cell to obtain a first sample value of the first memory cell. The first memory cell may be coupled to a first word line adjacent to the select word line, and may also be coupled to the same bit line as the target memory cell. For example, the first memory cell and the target memory cell are in the same memory string coupled to the same bit line and are adjacent to one another. In some implementations, the select word line can be the word line WL(n), and the first adjacent word line can be the word line WL(n−1) or WL(n+ 1).

Peripheral circuits 402 may perform the first sample read on the first memory cell to obtain the first sample value. The first sample read can be associated with a first set of Vth ranges. Specifically, the entire range of all possible Vth distributions of memory cells can be divided into the first set of Vth ranges. A read operation can be performed on the first memory cell according to the first set of Vth ranges, so that a first sample value of the Vth of the first memory cell can be obtained from the read operation. For example, the first set of Vth ranges may include two Vth ranges. In this case, the first sample read on the first memory cell can be an SLC read on the first memory cell (e.g., treating the first memory cell as an SLC, no matter whether the first memory cell is actually an MLC, a QLC, or any other type of memory cell). If the Vth of the first memory cell falls into a first one of the two Vth ranges, then a first sample value of "S0" (e.g., S0=0) corresponding to the first one of the two Vth ranges can be obtained. If the Vth of the first memory cell falls into a second one of the two Vth ranges, a first sample value of "S1" (e.g., S1=1) corresponding to the second one of the two Vth ranges can be obtained. An example implementation of the first sample read is illustrated below with reference to FIG. 9A.

In another example, the first set of Vth ranges may include four Vth ranges. In this case, the first sample read on the first memory cell can be an MLC read on the first memory cell (e.g., treating the first memory cell as an MLC, no matter whether the first memory cell is actually an SLC, a QLC, or any other type of memory cell). A first sample value of "00" corresponding to a first one of the four Vth ranges can be obtained if the Vth of the first memory cell falls into the first one of the four Vth ranges. A first sample value of "01" corresponding to a second one of the Vth ranges can be obtained if the Vth of the first memory cell falls into the second one of the Vth ranges. A first sample value of "11" corresponding to a third one of the Vth ranges can be obtained if the Vth of the first memory cell falls into the third one of the Vth ranges. A first sample value of "10" corresponding to a fourth one of the Vth ranges can be obtained if the Vth of the first memory cell falls into the fourth one of the Vth ranges.

Method 800 proceeds to operation 806, as illustrated in FIG. 8, in which one or more verification parameters of the target memory cell can be configured based on the first sample value of the first memory cell. In the following description of operation 806, assuming that the first set of Vth ranges may include at least a first Vth range and a second Vth range. Vth values in the first Vth range can be smaller than Vth values in the second Vth range (e.g., a first Vth value in the first Vth range is smaller than a second Vth value in the second Vth range).

In some implementations, the one or more verification parameters may include a set of verification voltages for the target memory cell associated with the target program state. Peripheral circuits 402 may determine a default verification voltage for the target program state. For example, as shown in FIG. 7C or 7E, if the target program state is P1, a default verification voltage can be the verification voltage Vvf_1 for the coarse program pass (or the verification voltage V'vf_1 for the fine program pass). In another example, if the target program state is P2, a default verification voltage for the target program state P2 can be the verification voltage Vvf_2 for the coarse program pass (or the verification voltage V'vf_2 for the fine program pass).

Specifically, responsive to the first sample value of the first memory cell corresponding to the first Vth range from the first set of Vth ranges, peripheral circuits 402 may determine a first verification voltage for the target memory cell based on the target program state of the target memory cell. Alternatively, responsive to the first sample value of the first memory cell corresponding to the second Vth range from the first set of Vth ranges, peripheral circuits 402 may determine a second verification voltage for the target memory cell based on the target program state of the target memory cell. A first verification offset of the first verification voltage relative to the default verification voltage can be greater than a second verification offset of the second verification voltage relative to the default verification voltage.

For example, peripheral circuits 402 may determine a set of verification offsets based on the first sample value, and then determine the set of verification voltages based on the default verification voltage of the target program state and the set of verification offsets. Each verification voltage can be equal to the sum of the default verification voltage and a corresponding verification offset. For example, if the first sample value corresponds to the first Vth range, peripheral circuits 402 may determine a first verification offset and then determine the first verification voltage to be equal to the sum of the first verification offset and the default verification voltage (e.g., the first verification voltage=the default verification voltage+the first verification offset). The first verification voltage may be a first corrected version of the default verification voltage for the target program state when the first sample value corresponds to the first Vth range. If the first sample value corresponds to the second Vth range, peripheral circuits 402 may determine a second verification offset and then determine the second verification voltage to be equal to the sum of the second verification offset and the default verification voltage (e.g., the second verification voltage=the default verification voltage+the second verification offset). The second verification voltage may be a second corrected version of the default verification voltage for the target program state when the first sample value corresponds to the second Vth range. The first verification offset and the second verification offset can have any suitable voltage values, with the first verification offset being greater than the second verification offset (e.g., the first verification offset>the second verification offset).

Next, peripheral circuits 402 may verify the programming of the target memory cell based on the set of verification voltages and the first sample value of the first memory cell. For example, if the first sample value corresponds to the first Vth range, peripheral circuits 402 may apply the first verification voltage to verify the programming of the target memory cell (e.g., to determine whether the Vth of the target memory cell has reached the first verification voltage). Responsive to the Vth of the target memory cell reaching the first verification voltage, it is determined that the target memory cell is programmed into the target program state. Alternatively, if the first sample value corresponds to the second Vth range, peripheral circuits 402 may apply the second verification voltage to verify the programming of the target memory cell (e.g., to determine whether the Vth of the target memory cell has reached the second verification voltage). Responsive to the Vth of the target memory cell reaching the second verification voltage, it is determined that the target memory cell is programmed into the target program state.

In some examples, as long as the first verification offset is greater than the second verification offset, the first verification voltage and the second verification voltage can be greater than, equal to, or smaller than the default verification voltage, which is not limited herein. Since the first verification offset is greater than the second verification offset, the Vth of the target memory cell verified by the first verification voltage can be shifted right compared to the Vth of the target memory cell verified by the second verification voltage. If the first verification voltage and the second verification voltage are greater than the default verification voltage, (1) the Vth of the target memory cell verified by the first verification voltage and (2) the Vth of the target memory cell verified by the second verification voltage can be shifted right compared to the Vth of the target memory cell verified by the default verification voltage.

In some implementations, the one or more verification parameters may include a first set of SO development times. Specifically, peripheral circuits 402 may determine a default SO development time for the target program state. Responsive to the first sample value corresponding to the first Vth range, peripheral circuits 402 may determine a first SO development time for the target memory cell. Alternatively, responsive to the first sample value corresponding to the second Vth range, peripheral circuits 402 may determine a second SO development time for the target memory cell. The first SO development time can be greater than the second SO development time.

Next, peripheral circuits 402 may verify the programming of the target memory cell based on the first set of SO development times and the first sample value of the first memory cell. For example, if the first sample value corresponds to the first Vth range, peripheral circuits 402 may apply the first SO development time to replace the default development time when verifying the programming of the target memory cell. Alternatively, if the first sample value corresponds to the second Vth range, peripheral circuits 402 may apply the second SO development time to replace the default development time when verifying the programming of the target memory cell.

In some examples, as long as the first SO development time is greater than the second SO development time, the first SO development time and the second SO development time can be greater than, equal to or smaller than the default SO development time, which is not limited herein. Since the first SO development time is greater than the second SO development time, the Vth of the target memory cell when the first SO development time is applied can be shifted right compared to the Vth of the target memory cell when the second SO development time is applied. If the first SO development time and the second SO development time are greater than the default SO development time, (1) the Vth of the target memory cell when the first SO development time is applied and (2) the Vth of the target memory cell when the second SO development time is applied can be shifted right compared to the Vth of the target memory cell when the default SO development time is applied.

In some implementations, the one or more verification parameters may include a first set of pass-through voltages. Specifically, peripheral circuits 402 may determine a default pass-through voltage for the target program state. Responsive to the first sample value corresponding to the first Vth range, peripheral circuits 402 may determine a first pass-through voltage to be applied in one or more unselect word lines. Alternatively, responsive to the first sample value corresponding to the second Vth range, peripheral circuits 402 may determine a second pass-through voltage to be applied in the one or more unselect word lines. The first pass-through voltage may be greater than the second pass-through voltage.

Next, peripheral circuits 402 may verify the programming of the target memory cell based on the first set of pass-through voltages and the first sample value of the first memory cell. For example, if the first sample value corresponds to the first Vth range, peripheral circuits 402 may apply the first pass-through voltage to the one or more unselect word lines when verifying the programming of the target memory cell. For example, the first pass-through voltage may replace the default pass-through voltage and be applied to the one or more unselect word lines, such as the word line WL(n−1) or the word line WL(n+1), whereas the default pass-through voltages can still be applied to any remaining unselect word lines. Alternatively, if the first sample value corresponds to the second Vth range, peripheral circuits 402 may apply the second pass-through voltage to the one or more unselect word lines when verifying the programming of the target memory cell. For example, the second pass-through voltage may replace the default pass-through voltage and be applied to the one or more unselect word lines, such as the word line WL(n−1) or the word line WL(n+1), whereas the default pass-through voltages can still be applied to any remaining unselect word lines.

In some examples, as long as the first pass-through voltage is greater than the second pass-through voltage, the first pass-through voltage and the second pass-through voltage can be greater than, equal to, or smaller than the default pass-through voltage, which is not limited herein. Since the first pass-through voltage is greater than the second pass-through voltage, the Vth of the target memory cell when the first pass-through voltage is applied can be shifted right compared to the Vth of the target memory cell when the second pass-through voltage is applied. If the first pass-through voltage and the second pass-through voltage are greater than the default pass-through voltage, (1) the Vth of the target memory cell when the first pass-through voltage is applied and (2) the Vth of the target memory cell when the second pass-through voltage is applied can be shifted right compared to the Vth of the target memory cell when the default pass-through voltage is applied.

In some implementations, the one or more verification parameters may include a first set of bias level voltages for biasing a voltage of the bit line coupled to the target memory cell. Specifically, peripheral circuits 402 may determine a default bias level voltage for the target program state. Responsive to the first sample value corresponding to the first Vth range, peripheral circuits 402 may determine a first bias level voltage for the target memory cell. Alternatively, responsive to the first sample value corresponding to the second Vth range, peripheral circuits 402 may determine a second bias level voltage for the target memory cell. The first bias level voltage can be greater than the second bias level voltage.

Next, peripheral circuits 402 may verify the programming of the target memory cell based on the first set of bias level voltages and the first sample value of the first memory cell. For example, if the first sample value corresponds to the first Vth range, peripheral circuits 402 may apply the first bias level voltage to the bit line coupled to the target memory cell when verifying the programming of the target memory cell. Alternatively, if the first sample value corresponds to the second Vth range, peripheral circuits 402 may apply the second bias level voltage to the bit line coupled to the target memory cell when verifying the programming of the target memory cell.

In some examples, as long as the first bias level voltage is greater than the second bias level voltage, the first bias level voltage and the second bias level voltage can be greater than, equal to, or smaller than the default bias level voltage, which is not limited herein. Since the first bias level voltage is greater than the second bias level voltage, the Vth of the target memory cell when the first bias level voltage is applied can be shifted right compared to the Vth of the target memory cell when the second bias level voltage is applied. If the first bias level voltage and the second bias level voltage are greater than the default bias level voltage, (1) the Vth of the target memory cell when the first bias level voltage is applied and (2) the Vth of the target memory cell when the second bias level voltage is applied can be shifted right compared to the Vth of the target memory cell when the default bias level voltage is applied.

Method 800 proceeds to operation 808, as illustrated in FIG. 8, in which a second sample read can be performed on a second memory cell to obtain a second sample value of the second memory cell. The second memory cell can be coupled to a second word line adjacent to the select word line, and may also be coupled to the same bit line as the target memory cell. For example, the second memory cell and the target memory cell are in the same memory string coupled to the same bit line and are adjacent to one another. In some implementations, the select word line can be the word line WL(n). The second adjacent word line can be the word line WL(n−1) or WL(n+1).

Peripheral circuits 402 may perform the second sample read on the second memory cell to obtain the second sample value of the second memory cell. The second sample read can be associated with a second set of Vth ranges. Specifically, the entire Vth range of all possible Vths of memory cells can be divided into the second set of Vth ranges. A read operation can be performed on the second memory cell according to the second set of Vth ranges, so that the second sample value of the Vth of the second memory cell can be obtained from the read operation. For example, the second set of Vth ranges may include two Vth ranges. In this case, the second sample read on the second memory cell can be an SLC read on the second memory cell. An example implementation of the second sample read as an SLC read is illustrated with reference to FIG. 10A. In another example, the second set of Vth ranges may include four Vth ranges, and in this case, the second sample read on the second memory cell can be an MLC read on the second memory cell.

The second sample read may include operations like those of the first sample read, except that the second sample read is associated with the second set of Vth ranges, whereas the first sample read is associated with the first set of Vth ranges. For example, the first sample read can be an SLC read, whereas the second sample read can be an MLC read. In some implementations, the first set of Vth ranges can be the same as the second set of Vth ranges, and the first sample read is the same as the second sample read. For example, each of the first sample read and the second sample read can be an SLC read. In another example, each of the first sample read and the second sample read can be an MLC read.

Method 800 proceeds to operation 810, as illustrated in FIG. 8, in which one or more read parameters of the target memory cell can be configured based on the second sample value. In the following description of operation 810, assuming that the second set of Vth ranges may include at least a third Vth range and a fourth Vth range. Vth values in the third Vth range can be smaller than Vth values in the fourth Vth range (e.g., a third Vth value in the third Vth range is smaller than a fourth Vth value in the fourth Vth range).

In some implementations, the one or more read parameters may include a set of read voltages. Specifically, peripheral circuits 402 may determine a set of default read voltages for the target memory cell. For example, if the target memory cell is an SLC, peripheral circuits 402 may determine a default read voltage for the target memory cell. The default read voltage can be used to distinguish the Vths of memory cells having the erased state P0 and the Vths of memory cells having the program state P1. The default read voltage can be applied to the select word line to sense the state of the target memory cell (e.g., to determine whether the Vth of the target memory cell is greater than or smaller than the default read voltage). In another example, if the target memory cell is an MLC, peripheral circuits 402 may determine three default read voltages for the target memory cell. The three default read voltages can be used to distinguish the Vths of memory cells having the erased state P0, the Vths of memory cells having the program state P1, the Vths of memory cells having the program state P2, and the Vths of memory cells having the program state P3. The three default read voltages can be applied to the select word line, respectively, to sense a state of the target memory cell (e.g., to determine whether the Vth of the target memory cell is greater than or smaller than the three default read voltages, respectively).

Responsive to the second sample value corresponding to the third Vth range from the second set of Vth ranges, peripheral circuits 402 may determine a first subset of read voltages for the target memory cell. The first subset of read voltages may have a one-to-one correspondence with the set of default read voltages, and may be a first corrected version of the set of default read voltages when the second sample value corresponds to the third Vth range. Alternatively, responsive to the second sample value corresponding to the fourth Vth range from the second set of Vth ranges, peripheral circuits 402 may determine a second subset of read voltages for the target memory cell. The second subset of read voltages may have a one-to-one correspondence with the set of default read voltages, and may be a second corrected version of the set of default read voltages when the second sample value corresponds to the fourth Vth range.

For each read voltage in the first subset of read voltages, a first read offset of the read voltage relative to a respective default read voltage can be smaller than a second read offset of a corresponding one in the second subset of read voltages relative to the respective default read voltage. For example, a first read voltage from the first subset and a second read voltage from the second subset correspond to a default read voltage, respectively. The first read voltage is equal to the sum of the default read voltage and a first read offset, and the second read voltage is equal to the sum of the default read voltage and a second read offset (e.g., the first read voltage=the default read voltage+the first read offset, the second read voltage=the default read voltage+the second read offset, and the first read offset<the second read offset).

Next, peripheral circuits 402 may apply the set of read voltages to read the target memory cell during the read operation on the target memory cell. For example, if the second sample value corresponds to the third Vth range, peripheral circuits 402 may apply the first subset of read voltages to read the target memory cell. Alternatively, if the second sample value corresponds to the fourth Vth range, peripheral circuits 402 may apply the second subset of read voltages to read the target memory cell. Since a first read offset of each read voltage from the first subset relative to a respective default read voltage is smaller than a second read offset of a corresponding read voltage in the second subset relative to the respective default read voltage, the Vth of the target memory cell being sensed by the first subset of read voltages can be shifted right compared to the Vth of the target memory cell being sensed by the second subset of read voltages.

In some implementations, the one or more read parameters may include a second set of SO development times. Specifically, peripheral circuits 402 may determine a default SO development time for the target memory cell. Responsive to the second sample value corresponding to the third Vth range, peripheral circuits 402 may determine a third SO development time, which is a corrected version of the default SO development time. Alternatively, responsive to the second sample value corresponding to the fourth Vth range, peripheral circuits 402 may determine a fourth SO development time, which is another corrected version of the default SO development time. The third SO development time can be smaller than the fourth SO development time.

Next, peripheral circuits 402 may apply the second set of SO development times to read the target memory cell during the read operation on the target memory cell. For example, if the second sample value corresponds to the third Vth range, peripheral circuits 402 may apply the third SO development time to read the target memory cell. Alternatively, if the second sample value corresponds to the fourth Vth range, peripheral circuits 402 may apply the fourth SO development time to read the target memory cell. Since the third SO development time is smaller than the fourth SO development time, the Vth of the target memory cell when the third SO development time is applied in the read operation can be shifted right compared to the Vth of the target memory cell when the fourth SO development time is applied in the read operation.

In some implementations, the one or more read parameters may include a second set of pass-through voltages. Specifically, peripheral circuits 402 may determine a default pass-through voltage for the target memory cell. Responsive to the second sample value corresponding to the third Vth range, peripheral circuits 402 may determine a third pass-through voltage which is a corrected version of the default pass-through voltage. Alternatively, responsive to the second sample value corresponding to the fourth Vth range, peripheral circuits 402 may determine a fourth pass-through voltage which is another corrected version of the default pass-through voltage. The third pass-through voltage can be smaller than the fourth pass-through voltage.

Next, peripheral circuits 402 may apply the second set of pass-through voltages to read the target memory cell during the read operation on the target memory cell. For example, if the second sample value corresponds to the third Vth range, peripheral circuits 402 may apply the third pass-through voltage to read the target memory cell. For example, the third pass-through voltage can be applied to one or more unselect word lines, such as WL(n−1), WL(n+1), whereas the default pass-through voltage can still be applied to any remaining unselect word lines. Alternatively, if the second sample value corresponds to the fourth Vth range, peripheral circuits 402 may apply the fourth pass-through voltage to read the target memory cell. For example, the fourth pass-through voltage can be applied to the one or more unselect word lines, such as WL(n−1), WL(n+1), whereas the default pass-through voltage can still be applied to any remaining unselect word lines. Since the third pass-through voltage is smaller than the fourth pass-through voltage, the Vth of the target memory cell when the third pass-through voltage is applied can be shifted right compared to the Vth of the target memory cell when the fourth pass-through voltage is applied.

In some implementations, the one or more read parameters may include a second set of bias level voltages for biasing a voltage of the bit line coupled to the target memory cell. Specifically, peripheral circuits 402 may determine a default bias level voltage for biasing the voltage of the bit line coupled to the target memory cell. Responsive to the second sample value corresponding to the third Vth range, peripheral circuits 402 may determine a third bias level voltage, which is a corrected version of the default bias level voltage. Alternatively, responsive to the second sample value corresponding to the fourth Vth range, peripheral circuits 402 may determine a fourth bias level voltage, which is another corrected version of the default bias level voltage. The third bias level voltage can be smaller than the fourth bias level voltage.

Next, peripheral circuits 402 may apply the second set of bias level voltages to read the target memory cell during the read operation on the target memory cell. For example, if the second sample value corresponds to the third Vth range, peripheral circuits 402 may apply the third bias level voltage to read the target memory cell. For example, the third bias level voltage can be applied to bias the bit line during the read operation. Alternatively, if the second sample value corresponds to the fourth Vth range, peripheral circuits 402 may apply the fourth bias level voltage to read the target memory cell. For example, the fourth bias level voltage can be applied to bias the bit line during the read operation. Since the third bias level voltage is smaller than the fourth bias level voltage, the Vth of the target memory cell when the third bias level is applied can be shifted right compared to the Vth of the target memory cell when the fourth bias level voltage is applied.

Consistent with some aspects of the present disclosure, a single-pass program operation can be applied to program the target memory cell coupled to the select word line WL(n) in one pass. In this case, the first word line in the first sample read with reference to operation 804 (e.g., the first adjacent word line in the assisted verification scheme disclosed herein) can be the word line WL(n−1). The second word line in the second sample read with reference to operation 808 (e.g., the second adjacent word line in the assisted read scheme disclosed herein) can be the word line WL(n+1).

Consistent with some aspects of the present disclosure, a multi-pass program operation can be applied to program the target memory cell coupled to the select word line WL(n) in multiple passes, which may include a coarse program pass and a fine program pass. In this case, the assisted verification scheme and the assisted read scheme disclosed herein can be applied during the fine program pass of the select word line WL(n). The first adjacent word line in the first sample read of the assisted verification scheme can be the word line WL(n−1). The second adjacent word line in the second sample read of the assisted read scheme can be the word line WL(n+1). Alternatively, the first adjacent word line in the first sample read can be the word line WL(n+1). The second adjacent word line in the second sample read can be the word line WL(n−1).

FIGS. 9A-9G illustrate an example implementation of the assisted verification scheme applied in a program operation, according to some aspects of the present disclosure. In FIGS. 9A-9G, the program operation may be configured to program a target memory cell coupled to a select word line. A first memory cell may be coupled to a first word line adjacent to the select word line, and may also be coupled to the same bit line as the target memory cell. The target memory cell and the first memory cell are MLCs by ways of examples. The target memory cell may be programmed into a target program state, which can be one of P0-P3. The first memory cell may also be programmed into one of the program states P0-P3.

Referring to FIG. 9A, a first sample read on the first memory cell can be an SLC read, and can be associated with a first set of Vth ranges including a first Vth range 902 and a second Vth range 904. A Vth distribution of memory cells having the target program state P0 and a Vth distribution of memory cells having the target program state P1 are within first Vth range 902. A Vth distribution of memory cells having the target program state P2 and a Vth distribution of memory cells having the target program state P3 are within second Vth range 904. First Vth range 902 and second Vth range 904 are separated by a read voltage Vsample_read of the first sample read. For example, during the first sample read on the first memory cell, the read voltage Vsample_read can be applied to the first word line coupled to the first memory cell to select the first word line. If the Vth of the first memory cell falls into first Vth range 902 (e.g., the Vth of the first memory cell is smaller than the read voltage Vsample_read), indicating that the first memory cell has the P0 state or the P1 state, a first sample value of "S0" corresponding to first Vth range 902 can be obtained (e.g., S0=0). If the Vth of the first memory cell falls into second Vth range 904 (e.g., the Vth of the first memory cell is greater than the read voltage Vsample_read), indicating that the first memory cell has the P2 state or the P3 state, the first sample value of "S1" corresponding to second Vth range 904 can be obtained (e.g., S0=1).

Referring to FIG. 9B, one or more verification parameters for the target memory cell are illustrated. For example, if the target program state of the target memory cell is P1, then a verification-voltage parameter Vverify(1) can be used to verify the programming of the target memory cell. If the target program state of the target memory cell is P2, then a verification-voltage parameter Vverify(2) can be used to verify the programming of the target memory cell. If the target program state of the target memory cell is P3, then a verification-voltage parameter Vverify(3) can be used to verify the programming of the target memory cell. A pass-through-voltage parameter Vpass is also illustrated in FIG. 9B.

FIG. 9C illustrates a table (Table 1) listing different configurations for the verification-voltage parameters Vverify(1), Vverify(2), and Vverify(3) associated with the target program states P1-P3, respectively. At default (when the assisted verification scheme disclosed herein is not applied), the verification-voltage parameters Vverify(1), Vverify(2), and Vverify(3) can be configured to be default verification voltages Vverify(1)_d, Vverify(2)_d, and Vverify(3)_d, respectively.

When the assisted verification scheme disclosed herein is applied, the verification-voltage parameters Vverify(1), Vverify(2), and Vverify(3) can be configured as follows. For example, when the target program state of the target memory cell is P1, the verification-voltage parameter Vverify(1) is configured to include a first set of verification voltages Vverify(1)_1, Vverify(1)_2 for the target memory cell. Specifically, if the first sample value of the first memory cell corresponds to first Vth range 902, the verification-voltage parameter Vverify(1) can be configured to be a first verification voltage Vverify(1)_1. Then, the first verification voltage Vverify(1)_1 may be applied to verify the programming of the target memory cell. Alternatively, if the first sample value of the first memory cell corresponds to second Vth range 904, the verification-voltage parameter Vverify(1) can be configured to be a second verification voltage Vverify(1)_2. Then, the second verification voltage Vverify(1)_2 may be applied to verify the programming of the target memory cell. A first verification offset of the first verification voltage Vverify(1)_1 relative to the default verification voltage Vverify(1)_d can be greater than a second verification offset of the second verification voltage Vverify(1)_2 relative to the default verification voltage Vverify(1)_d.

Similarly, when the target program state of the target memory cell is P2, the verification-voltage parameter Vverify(2) is configured to include a second set of verification voltages Vverify(2)_1, Vverify(2)_2 for the target memory cell. When the target program state of the target memory cell is P3, the verification-voltage parameter Vverify(3) is configured to include a third set of verification voltages Vverify(3)_1, Vverify(3)_2 for the target memory cell. A similar description will not be repeated herein.

FIG. 9D illustrates a table (Table 2) listing different configurations for an SO-development-time parameter. At default (when the assisted verification scheme disclosed herein is not applied), the SO-development-time parameter can be configured to be a default SO development time Tso_d.

When the assisted verification scheme disclosed herein is applied, the SO-development-time parameter can be configured as follows. For example, the SO-development-time parameter is configured to include a first set of SO development times for the target memory cell. Specifically, if the first sample value of the first memory cell corresponds to first Vth range 902, the SO-development-time parameter can be configured to be a first SO development time Tso_1. Then, the first SO development time Tso_1 may be applied when verifying the programming of the target memory cell. Alternatively, if the first sample value of the first memory cell corresponds to second Vth range 904, the SO-development-time parameter can be configured to be a second SO development time Tso_2, so that the second SO development time Tso_2 may be applied when verifying the programming of the target memory cell. The first SO development time Tso_1 can be greater than the second SO development time Tso_2.

FIG. 9E illustrates a table (Table 3) listing different configurations for a bias-level-voltage parameter. At default (when the assisted verification scheme disclosed herein is not applied), the bias-level-voltage parameter can be configured to be a default bias-level-voltage Vbl_d.

When the assisted verification scheme disclosed herein is applied, the bias-level-voltage parameter can be configured as follows. For example, the bias-level-voltage parameter is configured to include a first set of bias level voltages for the target memory cell. Specifically, if the first sample value of the first memory cell corresponds to first Vth range 902, the bias-level-voltage parameter can be configured to be a first bias level voltage Vbl_1. Then, the first bias level voltage Vbl_1 may be applied to the bit line when verifying the programming of the target memory cell. Alternatively, if the first sample value of the first memory cell corresponds to second Vth range 904, the bias-level-voltage parameter can be configured to be a second bias level voltage Vbl_2. Then, the second bias level voltage Vbl_2 may be applied to the bit line when verifying the programming of the target memory cell. The first bias level voltage Vbl_1 can be greater than the second bias level voltage Vbl_2.

FIG. 9F illustrates a table (Table 4) listing different configurations for a pass-through-voltage parameter. At default (when the assisted verification scheme disclosed herein is not applied), the pass-through-voltage parameter Vpass can be configured to be a default pass-through voltage Vpass_d.

When the assisted verification scheme disclosed herein is applied, the pass-through-voltage parameter Vpass can be configured as follows. For example, the pass-through-voltage parameter Vpass is configured to include a first set of pass-through voltages for the target memory cell. Specifically, if the first sample value of the first memory cell corresponds to first Vth range 902, the pass-through-voltage parameter Vpass can be configured to be a first pass-through voltage Vpass_1. Then, the first pass-through voltage Vpass_1 may be applied to one or more unselect word lines when verifying the programming of the target memory cell. Alternatively, if the first sample value of the first memory cell corresponds to second Vth range 904, the pass-through-voltage parameter Vpass can be configured to be a second pass-through voltage Vpass_2. Then, the second pass-through voltage Vpass_2 may be applied to the one or more unselect word lines when verifying the programming of the target memory cell. The first pass-through voltage Vpass_1 can be greater than the second pass-through voltage Vpass_2.

FIG. 9G illustrates a table (Table 5) that provides a comparison of verification parameters when the first sample value corresponds to first Vth range 902 and second Vth range 904, respectively. For example, the first row of Table 5 indicates that the first bias level voltage Vbl_1 (when the first sample value corresponds to first Vth range 902) can be greater than the second bias level voltage Vbl_2 (when the first sample value corresponds to second Vth range 904), as described above with reference to FIG. 9E. The second row of Table 5 indicates that the first SO development time Tso_1 (when the first sample value corresponds to first Vth range 902) can be greater than the second SO development time Tso_2 (when the first sample value corresponds to second Vth range 904), as described above with reference to FIG. 9D. The third row of Table 5 indicates that the first pass-through voltage Vpass_1 (when the first sample value corresponds to first Vth range 902) can be greater than the second pass-through voltage Vpass_2 (when the first sample value corresponds to second Vth range 904), as described above with reference to FIG. 9F.

The fourth row of Table 5 indicates that, for the target program state P1, the first verification offset of the first verification voltage Vverify(1)_1 (when the first sample value corresponds to first Vth range 902) can be greater than the second verification offset of the second verification voltage Vverify(1)_2 (when the first sample value corresponds to second Vth range 904), as described above with reference to FIG. 9C. Similarly, for the target program state P2, the first verification offset of the first verification voltage Vverify(2)_1 can be greater than the second verification offset of the second verification voltage Vverify(2)_2. For the target program state P3, the first verification offset of the first verification voltage Vverify(3)_1 can be greater than the second verification offset of the second verification voltage Vverify(3)_2.

FIGS. 10A-10G illustrate an example implementation of the assisted read scheme applied in a read operation, according to some aspects of the present disclosure. In FIGS. 10A-10G, the read operation may be configured to read a target memory cell coupled to a select word line. A second memory cell may be coupled to a second word line adjacent to the select word line, and may also be coupled to the same bit line as the target memory cell. The target memory cell and the second memory cell are MLCs by way of examples. The target memory cell may have one of the program states P0-P3. The second memory cell may also have one of the program states P0-P3.

Figures 10A, 10B, 10C:
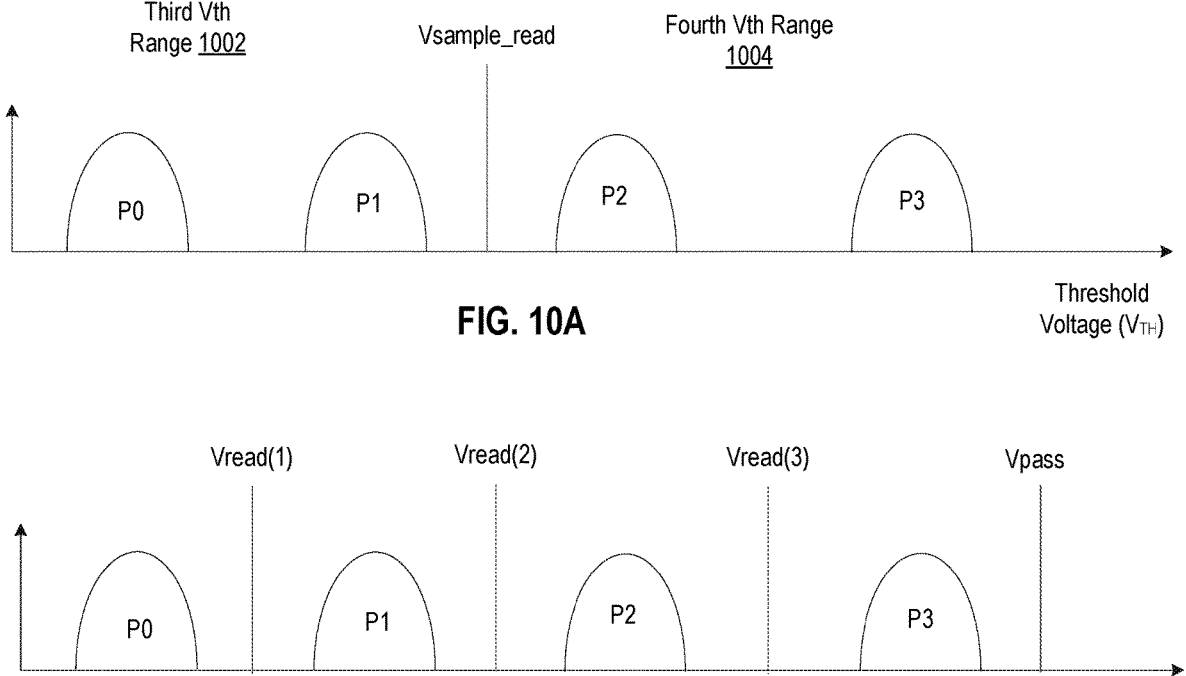

Referring to FIG. 10A, a second sample read on the second memory cell can be an SLC read, and can be associated with a second set of Vth ranges including a third Vth range 1002 and a fourth Vth range 1004. A Vth distribution of memory cells having the target program state P0 and a Vth distribution of memory cells having a target program state P1 are within third Vth range 1002. A Vth distribution of memory cells having the target program state P2 and a Vth distribution of memory cells having a target program state P3 are within fourth Vth range 1004. Third Vth range 1002 and fourth Vth range 1004 are separated by the read voltage Vsample_read. For example, during the second sample read on the second memory cell, the read voltage Vsample_read can be applied to the second word line coupled to the second memory cell. If the Vth of the second memory cell falls into third Vth range 1002 (e.g., the Vth of the second memory cell is smaller than the read voltage Vsample_read), indicating that the second memory cell has the P0 state or the P1 state (or the Vth of the second memory cell is smaller than the read voltage Vsample_read), a second sample value of "SO" corresponding to third Vth range 1002 can be obtained (e.g., S0=0). If the Vth of the second memory cell falls into fourth Vth range 1004 (e.g., the Vth of the second memory cell is greater than the read voltage Vsample_read), indicating that the second memory cell has the P2 state or the P3 state, the second sample value of "S1" corresponding to fourth Vth range 1004 can be obtained (e.g., S1=1).

Referring to FIG. 10B, one or more read parameters for the target memory cell are illustrated. For example, read-voltage parameters Vread(1), Vread(2), and Vread(3) can be applied to the select word line to sense the state of the target memory cell, respectively. A pass-through-voltage parameter Vpass is also illustrated in FIG. 10B.

FIG. 10C illustrates a table (Table 6) listing different configurations for the read-voltage parameters Vread(1), Vread(2), and Vread(3), respectively. At default (when the assisted read scheme disclosed herein is not applied), the read-voltage parameters Vread(1), Vread(2), and Vread(3) can be configured to be default read voltages Vread(1)_d, Vread(2)_d, and Vread(3)_d, respectively.

When the assisted read scheme disclosed herein is applied, the read-voltage parameters Vread(1), Vread(2), and Vread(3) can be configured as follows. For example, if the second sample value corresponds to third Vth range 1002, the read-voltage parameters Vread(1), Vread(2), and Vread(3) can be configured to be a first subset of read voltages (e.g., Vread(1)_1, Vread(2)_1, and Vread(3)_1), respectively. If the second sample value corresponds to fourth Vth range 1004, the read-voltage parameters Vread(1), Vread(2), and Vread(3) can be configured to be a second subset of read voltages (e.g., Vread(1)_2, Vread(2)_2, and Vread(3)_2), respectively.

A first read offset of each read voltage in the first subset relative to the respective default read voltage can be smaller than a second read offset of a corresponding read voltage in the second subset relative to the respective default read voltage. For example, a read offset of Vread(1)_1 relative to Vread(1)_d can be smaller than a read offset of Vread(1)_2 relative to Vread(1)_d. A read offset of Vread(2)_1 relative to Vread(2)_d can be smaller than a read offset of Vread(2)_2 relative to Vread(2)_d. A read offset of Vread(3)_1 relative to Vread(3)_d can be smaller than a read offset of Vread(3)_2 relative to Vread(3)_d.

FIG. 10D illustrates a table (Table 7) listing different configurations for an SO-development-time parameter. At default (when the assisted read scheme disclosed herein is not applied), the SO-development-time parameter can be configured to be a default SO development time Tso'_d.

When the assisted read scheme disclosed herein is applied, the SO-development-time parameter can be configured as follows. For example, the SO-development-time parameter is configured to include a second set of SO development times. Specifically, if the second sample value corresponds to third Vth range 1002, the SO-development-time parameter can be configured to be a third SO development time Tso'_1, so that the third SO development time Tso'_1 may be applied when reading the target memory cell. Alternatively, if the second sample value corresponds to fourth Vth range 1004, the SO-development-time parameter can be configured to be a fourth SO development time Tso'_2, so that the fourth SO development time Tso'_2 may be applied when reading the target memory cell. The third SO development time Tso'_1 can be smaller than the fourth SO development time Tso'_2.

FIG. 10E illustrates a table (Table 8) listing different configurations for a bias-level-voltage parameter for the target memory cell. At default (when the assisted read scheme disclosed herein is not applied), the bias-level-voltage parameter can be configured to be a default bias level voltage Vbl'_d.

When the assisted read scheme disclosed herein is applied, the bias-level-voltage parameter can be configured as follows. For example, the bias-level-voltage parameter is configured to include a second set of bias level voltages for the target memory cell. Specifically, if the second sample value corresponds to third Vth range 1002, the bias-level-voltage parameter can be configured to be a third bias level voltage Vbl'_1, so that the third bias level voltage Vbl'_1 may be applied to the bit line when reading the target memory cell. Alternatively, if the second sample value corresponds to fourth Vth range 1004, the bias-level-voltage parameter can be configured to be a fourth bias level voltage Vbl'_2, so that the fourth bias level voltage Vbl' 2 may be applied to the bit line when reading the target memory cell. The third bias level voltage Vbl'_1 can be greater than the fourth bias level voltage Vbl'_2.

FIG. 10F illustrates a table (Table 9) listing different configurations for a pass-through-voltage parameter for the target memory cell. At default (when the assisted read scheme disclosed herein is not applied), the pass-through-voltage parameter Vpass can be configured to be a default pass-through voltage Vpass'_d.

When the assisted read scheme disclosed herein is applied, the pass-through-voltage parameter Vpass can be configured as follows. For example, the pass-through-voltage parameter Vpass is configured to include a second set of pass-through voltages. Specifically, if the second sample value corresponds to third Vth range 1002, the pass-through-voltage parameter Vpass can be configured to be a third pass-through voltage Vpass'_1, so that the third pass-through voltage Vpass'_1 may be applied to one or more unselect word lines when reading the target memory cell. Alternatively, if the second sample value corresponds to fourth Vth range 1004, the pass-through-voltage parameter Vpass can be configured to be a fourth pass-through voltage Vpass'_2, so that the fourth pass-through voltage Vpass'_2 may be applied to the one or more unselect word lines when reading the target memory cell. The third pass-through voltage Vpass'_1 can be smaller than the fourth pass-through voltage Vpass'_2.

FIG. 10G illustrates a table (Table 10) which provides a comparison of read parameters when the second sample value corresponds to third Vth range 1002 and fourth Vth range 1004, respectively. For example, the first row of Table 10 indicates that the third bias level voltage Vbl'_1 (when the second sample value corresponds to third Vth range 1002) can be smaller than the fourth bias level voltage Vbl'_2 (when the second sample value corresponds to fourth Vth range 1004), as described above with reference to FIG. 10E. The second row of Table 10 indicates that the third SO development time Tso'_1 can be smaller than the fourth SO development time Tso'_2, as described above with reference to FIG. 10D. The third row of Table 10 indicates that the third pass-through voltage Vpass'_1 can be smaller than the fourth pass-through voltage Vpass'_2, as described above with reference to FIG. 10F.

The fourth row of Table 10 indicates that a read offset of the read voltage Vread(1)_1 in the first subset of read voltages can be smaller than a read offset of the corresponding read voltage Vread(1)_2 in the second subset of the read voltages, as described above with reference to FIG. 10C. Similarly, a read offset of the read voltage Vread(2)_1 in the first subset of read voltages can be smaller than a read offset of the corresponding read voltage Vread(2)_2 in the second subset of the read voltages. A read offset of the read voltage Vread(3)_1 in the first subset of read voltages can be smaller than a read offset of the corresponding read voltage Vread (3)_2 in the second subset of the read voltages.

Figure 11A:
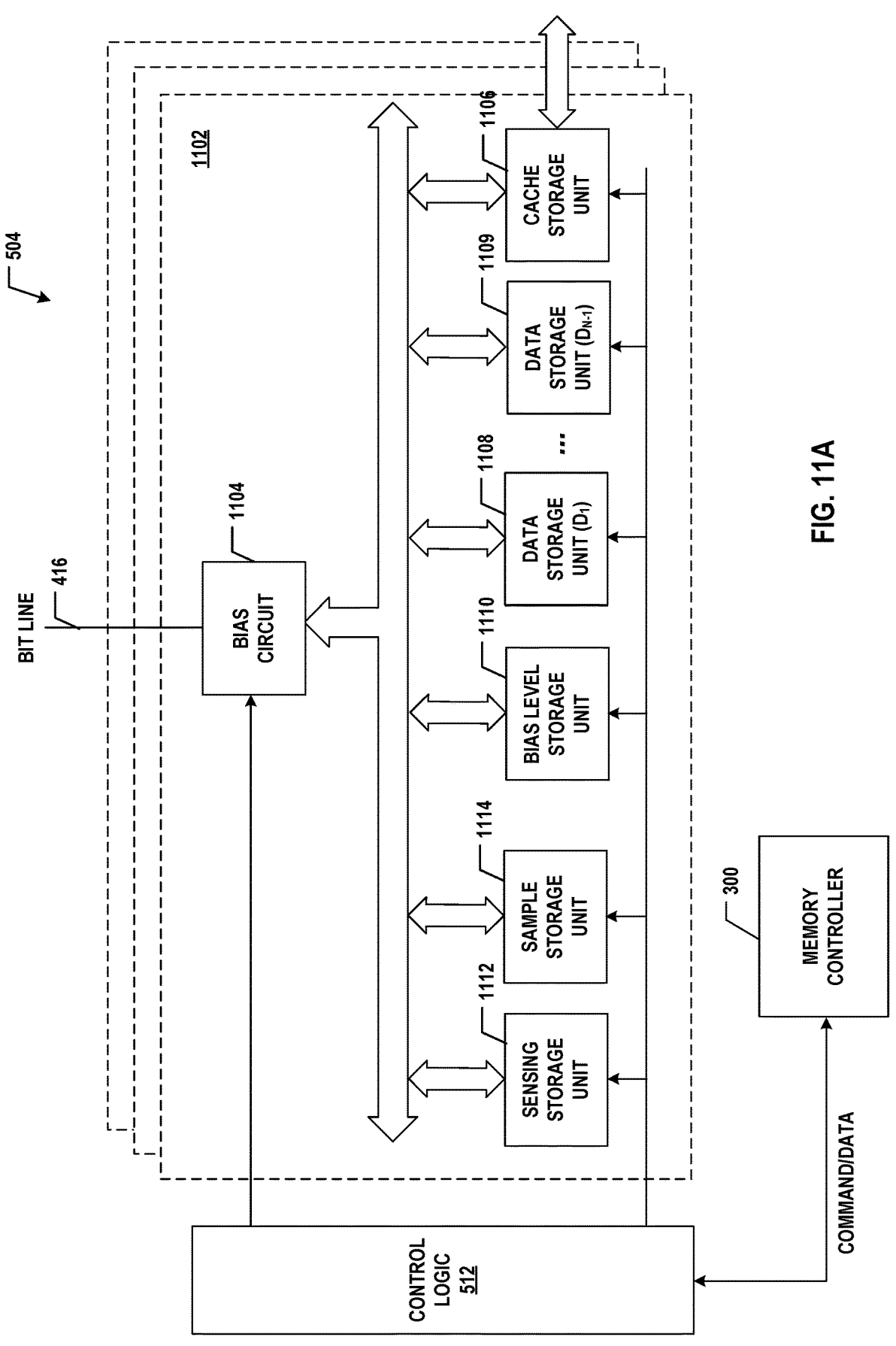
FIGS. 11A and 11B illustrate a page buffer circuit, according to some aspects of the present disclosure.
Figure 11B:
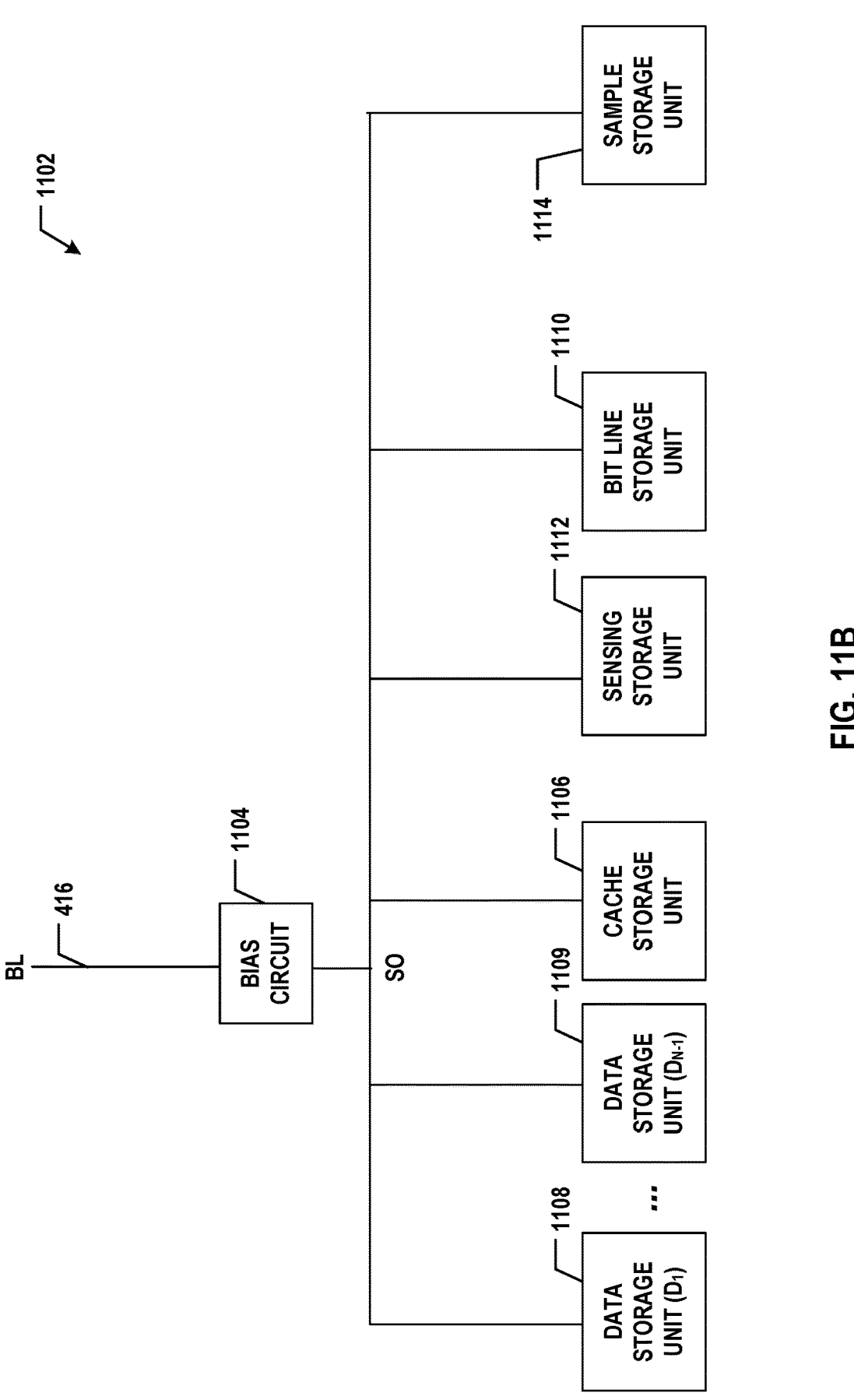

FIGS. 11A and 11B illustrate an example structure of a page buffer circuit in a page buffer (e.g., page buffer/sense amplifier 504), according to some aspects of the present disclosure. In some implementations, the page buffer in FIG. 11A includes a plurality of page buffer circuits 1102 each coupled to a respective one of bit lines 416. In other words, each page buffer circuit 1102 can be coupled to a respective column of memory cells 406 (e.g., NAND memory string 408) through a corresponding bit line 416 and configured to temporarily store a set of N-bits data that is used for programming a respective select memory cell 406 (coupled to select word line 418 and the corresponding bit line 416) in a program operation. All page buffer circuits 1102 together can temporarily store an entire data page (e.g., Q sets of the N-bits data) that are used for programming the select row of memory cells 406 coupled to select word line 418 in the program operation. For example, for TLCs where N=3 and Q=8, each page buffer circuit 1102 may be configured to temporarily store a respective set of the 8 sets of 3-bits data, which correspond to 8 levels, respectively. The 8 sets of 3-bits data may include 000, 001, 010, 011, 100, 101, 110, and 111.

Consistent with some aspects of the present disclosure, page buffer circuit 1102 shown in FIG. 11A or 11B can be coupled to a column of memory cells 406 including a target memory cell through a corresponding bit line 416, and configured to temporarily store a set of N-bits data that is used for programming the target memory cell (which is coupled to both a select word line WL(n) and the corresponding bit line 416) in a program operation. In some implementations, page buffer circuit 1102 can include a plurality of storage units and a bias circuit 1104 coupled to an SO node. The plurality of storage units may include N−1 data storage units (D$_1$, . . . , D$_{N-1}$) 1108, 1109, a cache storage unit 1106, a bias level (BL) storage unit 1110, a sensing storage unit 1112, and one or more sample storage units 1114.

During the program operation, each of N−1 data storage units 1108, 1109 can be configured to store a respective bit of the set of N-bits data (e.g., a respective bit of the N bits). As a result, N−1 data storage units 1108, 1109 can store N−1 bits of the set of N-bits data (e.g., N−1 bits of the N bits). The cache storage unit 1106 in page buffer circuit 1102 can also be configured to store one of the N bits from the set of N-bits data. That is, cache storage unit 1106 is configured to sequentially store one of the N bits from the set of N-bits data and each of the N bits from the next set of N-bits data, according to some implementations. In other words, cache storage unit 1106 can act as both a data storage unit and a cache storage unit in a time-division manner. Thus, the number of data storage units 1108, 1109 in each page buffer circuit 1102 becomes N−1 (D$_1$ to D$_{N-1}$).

In some implementations, sensing storage unit 1112 and BL storage unit 1110 may be configured to store non-data page information, i.e., any information other than the bits in a set of N-bits data. For example, sensing storage unit 1112 may be configured to store information indicative of whether the current operation performed by page buffer/sense amplifier 504 is a read operation or a program operation. BL storage unit 1110 (e.g., a 3BL storage unit) may be configured to store the bias information of the respective bit line 416 coupled to page buffer circuit 1102. In some implementations, BL storage unit 1110 may be a multipurpose storage unit that acts as both a BL storage unit and a cache storage unit in a time-division manner. Bias circuit 1104 may be coupled to the respective bit line 416 and configured to apply a bias level voltage to the respective bit line 416 coupled to the target memory cell in the program operation. For example, a high voltage level or a low voltage level can be used as the bias level voltage to bias the respective bit line 416. In some implementations, to optimize the threshold voltage distributions, for example, enlarging the read margins between adjacent levels and reducing the width of each level, a medium voltage level is used as well for biasing the voltage of the respective bit line 416. That is, three voltage levels, e.g., high, medium, and low, can be applied to the respective bit line 416 (referred to herein as 3BL). In some implementations, a voltage level applied to the respective bit line 416 (e.g., 3BL bias) is non-data page information stored in BL storage unit 1110.

In some implementations, one or more sample storage units 1114 may be configured to store a first sample value of a first memory cell or a second sample value of a second memory cell. The first memory cell is coupled to a first word line adjacent to the select word line, and the second memory cell is coupled to a second word line adjacent to the select word line. The first and second memory cells are coupled to the same bit line 416 as the target memory cell, and are adjacent to the target memory cell. For example, if the first sample value or the second sample value has 1 bit, one sample storage unit 1114 can be included in page buffer circuit 1102. In another example, if the first sample value or the second sample value has 2 bits, two sample storage units 1114 can be included in page buffer circuit 1102.

It is understood that each storage unit in page buffer circuit 1102 (including each data storage unit 1108, 1109, cache storage unit 1106, BL storage unit 1110, sensing storage unit 1112, and sample storage unit 1114) may be any circuit that has two stable states for storing a single bit of data, such as a latch or a flip-flop. For example, each storage unit may include a latch.

FIG. 12A illustrates changes in Vth distributions of memory cells after data retention, according to some examples. FIG. 12A is described above, and the similar description will not be repeated herein.

Figure 12B:
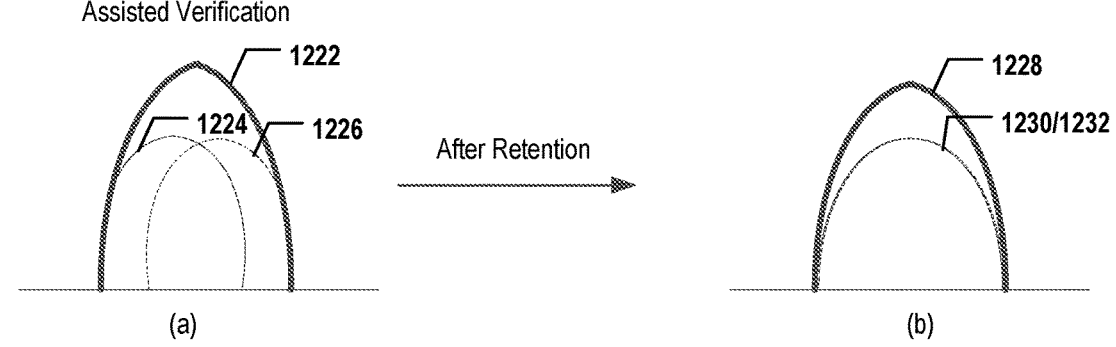
FIG. 12B illustrates changes in Vth distributions of memory cells after data retention when an assisted verification scheme is applied, according to some aspects of the present disclosure.

FIG. 12B illustrates changes in Vth distributions of memory cells after data retention when the assisted verification scheme is applied, according to some aspects of the present disclosure. FIG. 12B is described with reference to FIG. 12A. For example, assuming that the first, second, and third Vth distributions of the memory cells in FIG. 12A are shifted left due to lateral charge migration (e.g., charge loss). Then, the assisted verification scheme disclosed herein can be applied during a program operation of each of the memory cells. As a result, the first, second, and third Vth distributions of the memory cells can be shifted right and configured to be narrower in advance (before retention), as shown by curves 1224, 1226, and 1222 in section (a) of FIG. 12B, respectively. After retention, the first, second, and third Vth distributions of the memory cells are shown by curves 1230, 1232, and 1228 in section (b) of FIG. 12B, respectively. Even if the first, second, and third Vth distributions of the memory cells can be shifted left and become wider after retention, the first and second Vth distributions of the memory cells can be consistent with each other. The first, second, and third Vth distributions of the memory cells can still be narrower when compared with section (b) of FIG. 12A. Thus, the margin loss after retention can be reduced or recovered by applying the assisted verification scheme.

Figure 12C:
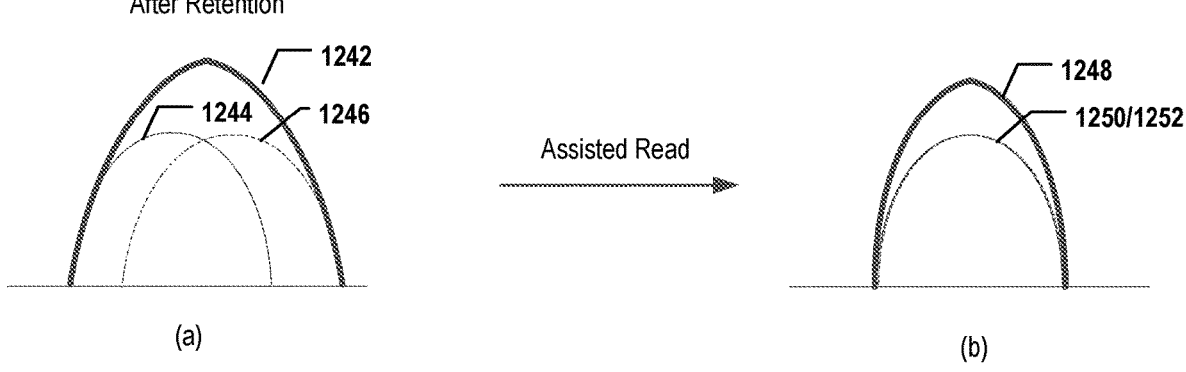
FIG. 12C illustrates changes in Vth distributions of memory cells when an assisted read scheme is applied, according to some aspects of the present disclosure.

FIG. 12C illustrates changes in Vth distributions of memory cells when the assisted read scheme disclosed herein is applied, according to some aspects of the present disclosure. FIG. 12C is described with reference to FIG. 12A. For example, after retention (when the assisted verification scheme disclosed herein is not applied), the first, second, and third Vth distributions of the memory cells are shifted left and become wider due to lateral charge migration (e.g., charge loss), as shown by curves 1244, 1246, and 1242 in section (a) of FIG. 12C. Curves 1244, 1246, and 1242 in section (a) of FIG. 12C can be the same as curves 1210, 1212, 1208 in section (b) of FIG. 12A, respectively. The assisted read scheme disclosed herein can be applied during a read operation of each of the memory cells, so that the first, second, and third Vth distributions of the memory cells can be shifted right and become narrower, as shown by curves 1250, 1252, and 1248 in section (b) of FIG. 12C, respectively. The first and second Vth distributions of the memory cells become consistent with each other. Thus, the margin loss after retention can be reduced or recovered by applying the assisted read scheme.

Figure 12D:
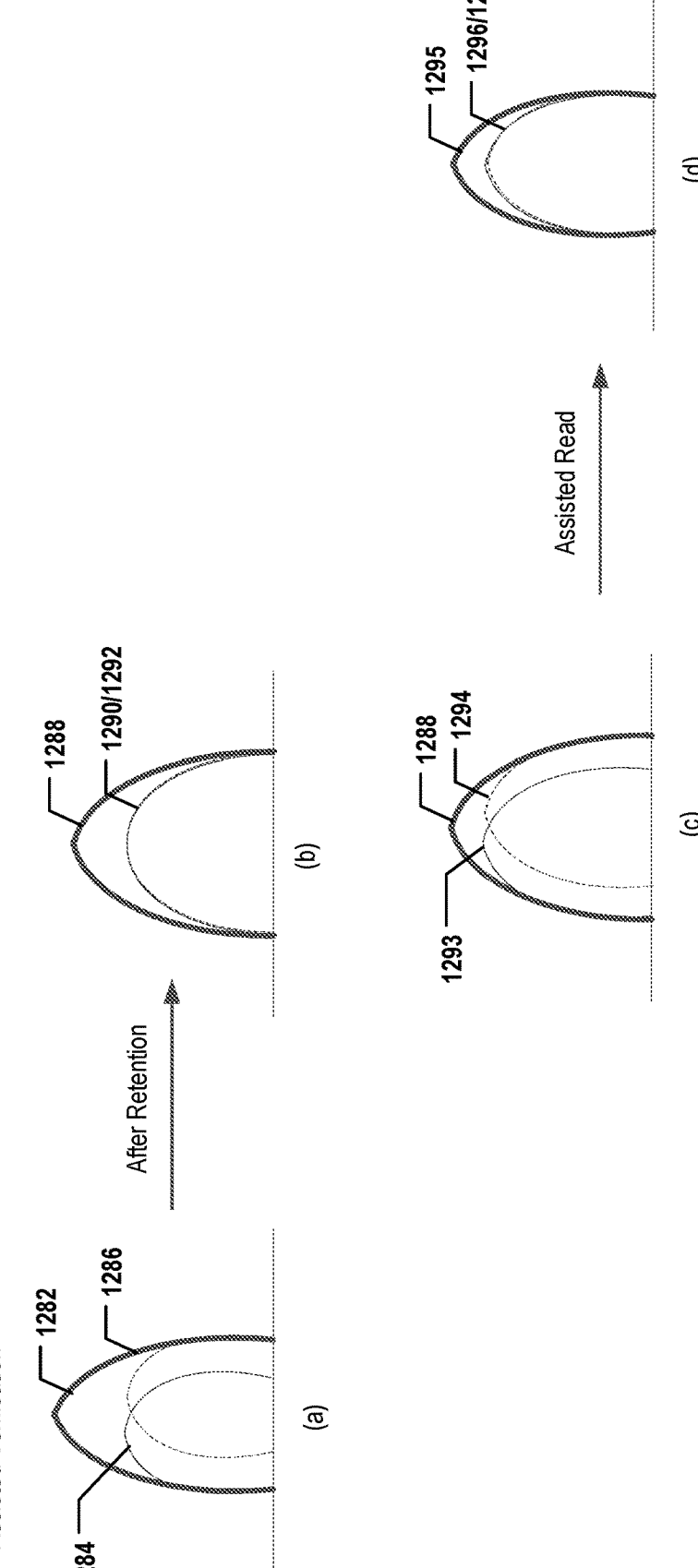
FIG. 12D illustrates changes in Vth distributions of memory cells when a combination of an assisted verification scheme and an assisted read scheme is applied, according to some aspects of the present disclosure.

FIG. 12D illustrates changes in Vth distributions of memory cells when a combination of the assisted verification scheme and the assisted read scheme disclosed herein is applied, according to some aspects of the present disclosure. FIG. 12D is described with reference to FIGS. 12B-12C. For example, the assisted verification scheme disclosed herein can be applied during a program operation of each of the memory cells, so that the first, second, and third Vth distributions of the memory cells can be shifted right and configured to be narrower in advance (before retention), as shown by curves 1284, 1286, and 1282 in section (a) of FIG. 12D, respectively. After retention, the first, second, and third Vth distributions of the memory cells are shown by curves 1290, 1292, and 1280 in section (b) of FIG. 12D, respectively. Even if the first, second, and third Vth distributions of the memory cells can be shifted left and become wider after retention, the first and second Vth distributions of the memory cells can be consistent with each other. The first, second, and third Vth distributions of the memory cells can still be narrower when compared with section (b) of FIG. 12A.

Assuming that the assisted verification scheme is performed based on a first sample read on each of first adjacent memory cells coupled to first adjacent word lines. Then, the effect of the Vths of first adjacent memory cells on the Vths of the memory cells can be reduced or eliminated by the assisted verification scheme. The effect of the Vths of second adjacent memory cells coupled to second adjacent word lines on the Vths of the memory cells remains. For example, the first, second, and third Vth distributions of the memory cells due to the effect of the Vths of the second adjacent memory cells coupled to the second adjacent word lines can be illustrated using curves 1293, 1294, and 1288 in section (c) of FIG. 12D, respectively. Next, the assisted read scheme disclosed herein can be applied during a read operation of each of the memory cells. As a result, the first, second, and third Vth distributions of the memory cells can be shifted right and become narrower, as shown by curves 1296, 1297, and 1295 in section (d) of FIG. 12D, respectively. The first and second Vth distributions of the memory cells become consistent with each other. Thus, the margin loss after retention can be reduced or recovered by applying the assisted verification scheme and the assisted read scheme.

Figure 13:
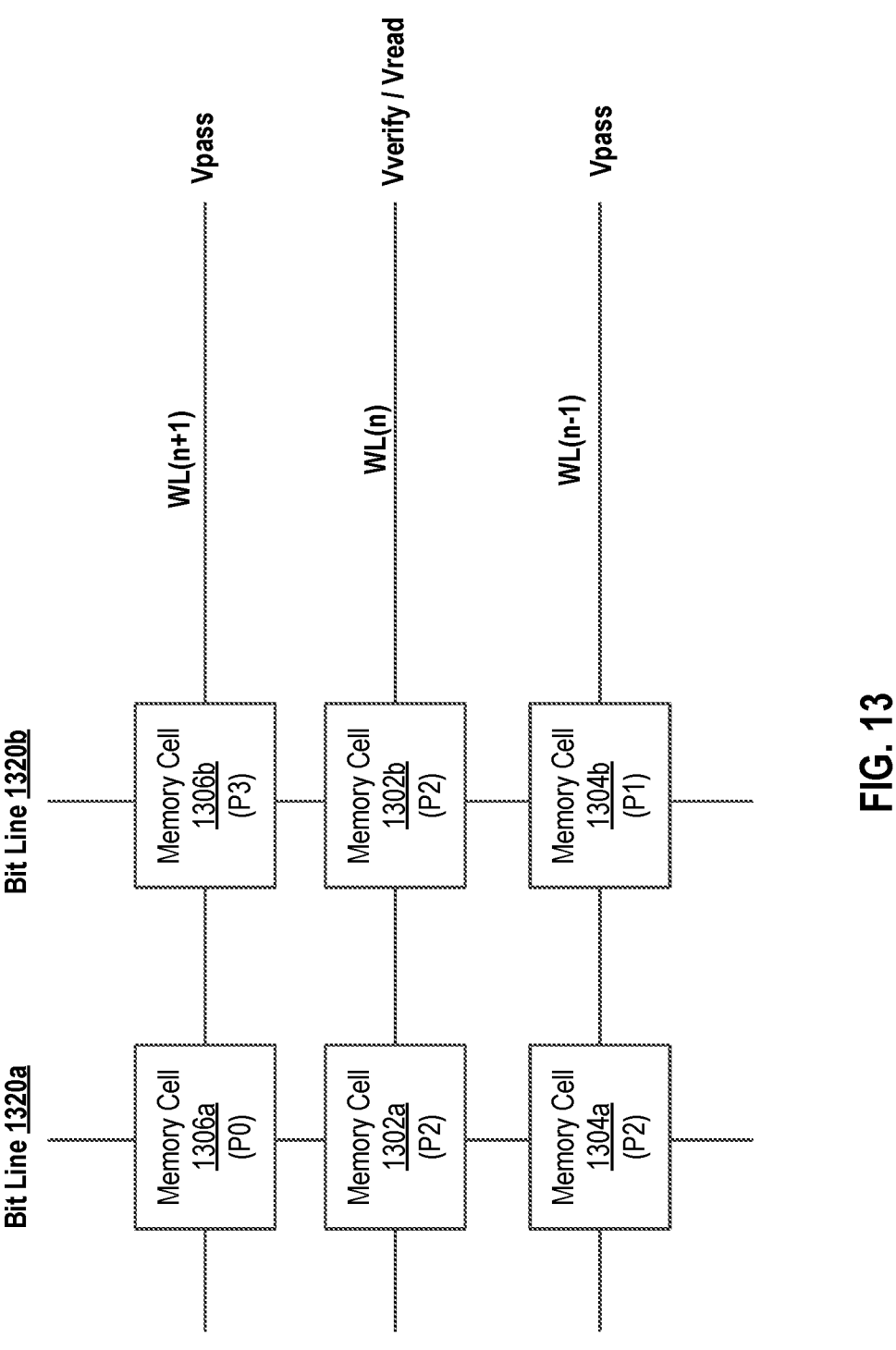
FIG. 13 illustrates an example block of memory cells in which the assisted verification scheme of FIGS. 9A-9G and the assisted read scheme of FIGS. 10A-10G are applied, according to some aspects of the present disclosure.

FIG. 13 illustrates an example block 1300 of memory cells (e.g., MLCs with program states P0-P3) in which the assisted verification scheme of FIGS. 9A-9G and the assisted read scheme of FIGS. 10A-10G are applied, according to some aspects of the present disclosure. FIG. 13 is described below with reference to FIGS. 9A-9G and 10A-10G. Assuming that memory cells 1302a and 1302b are coupled to a word line WL(n) with the same target program state P2. Memory cells 1304a and 1304b are coupled to a word line WL(n−1) with target program states P2 and P1, respectively. Memory cells 1306a and 1306b are coupled to a word line WL(n+1) with target program states P0 and P3, respectively. Memory cells 1302a, 1304a, and 1306a are coupled to a bit line 1320a. Memory cells 1302b, 1304b, and 1306b are coupled to a bit line 1320b.

At default, during program operations of the memory cells of FIG. 13, the default verification parameters such as the default verification voltages (Vverify(1)_d, Vverify(2)_d, Vverify(3)_d), the default SO development time (Tso_d), the default bias voltage level (Vbl_d), and the default pass-through voltage (Vpass_d) are applied.

Assuming that memory cells 1304a and 1304b coupled to the word line WL(n−1) are already programmed into their respective target program states P2 and P1. The assisted verification scheme disclosed herein is applied during a program operation when memory cells 1302a and 1302b coupled to the word line WL(n) are being programmed into their target program state P2. Initially, the first sample read is applied to memory cells 1304a and 1304b coupled to the word line WL(n−1) to obtain first sample values S1 and S0, respectively. The first sample value S0 corresponds to first Vth range 902 of FIG. 9A. The first sample value S1 corresponds to second Vth range 904 of FIG. 9A. Next, a program voltage can be applied to the select word line WL(n) to program memory cells 1302a and 1302b.

In some implementations, when the verification-voltage parameter Vverify(2) of FIG. 9B is used to verify the programming of memory cells 1302a and 1302b having the target program state P2, at first, the first verification voltage Vverify(2)_1 can be applied to the select word line WL(n) to verify the programming of memory cell 1302b (e.g., Vverify(2)=Vverify(2)_1), since the first sample value of the adjacent memory cell 1304b is S0, corresponding to first Vth range 902. Subsequently, the second verification voltage Vverify(2)_2 can be applied to the select word line WL(n) to verify the programming of memory cell 1302a (e.g., Vverify(2)=Vverify(2)_2), since the first sample value of the adjacent memory cell 1304a is S1, corresponding to second Vth range 904.

In some implementations, when the verification-voltage parameter Vverify(2) of FIG. 9B is used to verify the programming of memory cells 1302a and 1302b having the target program state P2 (e.g., with Vverify(2)=Vverify(2)_d), at first, the first pass-through voltage Vpass_1 can be applied to the adjacent word line WL(n−1) and/or the adjacent word line WL(n) during the verifying of memory cell 1302b, since the first sample value of the adjacent memory cell 1304b is S0, corresponding to first Vth range 902. Subsequently, the second pass-through voltage Vpass_2 can also be applied to the adjacent word line WL(n−1) and/or the adjacent word line WL(n) during the verifying of memory cell 1302a, since the first sample value of the adjacent memory cell 1304a is S1, corresponding to second Vth range 904.

In some implementations, when the verification-voltage parameter Vverify(2) of FIG. 9B is used to verify the programming of memory cells 1302a and 1302b having the target program state P2 (e.g., with Vverify(2)=Vverify(2)_d), (a) the first bias level voltage Vbl_1 can be applied to the bit line 1320b since the first sample value of the adjacent memory cell 1304b is S0, corresponding to first Vth range 902, and simultaneously, (b) the second bias level voltage Vbl_2 can be applied to the bit line 1320a since the first sample value of the adjacent memory cell 1304a is S1, corresponding to second Vth range 904.

In some implementations, when the verification-voltage parameter Vverify(2) of FIG. 9B is used to verify the programming of memory cells 1302a and 1302b having the target program state P2 (e.g., with Vverify(2)=Vverify(2)_d), (a) the first SO development time Tso_1 can be applied to the verifying of memory cell 1302b since the first sample value of the adjacent memory cell 1304b is S0, corresponding to first Vth range 902, and simultaneously, (b) the second SO development time Tso_2 can be applied to the verifying of memory cell 1302a since the first sample value of the adjacent memory cell 1304a is S1, corresponding to second Vth range 904.

The assisted verification scheme disclosed herein can also be applied during a program operation when memory cells 1306a and 1306b coupled to the word line WL(n+1) are programmed into their respective target program states P0 and P3. The similar description will not be repeated herein.

At default, during read operations of the memory cells of FIG. 13, the default read parameters such as the default read voltages (Vread(1)_d, Vread(2)_d, Vread(3)_d), the default SO development time (Tso'_d), the default bias voltage level (Vbl'_d), and the default pass-through voltage (Vpass'_d) are applied. The assisted read scheme disclosed herein is applied during a read operation when memory cells 1302a and 1302b coupled to the word line WL(n) are being read. Initially, the second sample read is applied to memory cells 1306a and 1306b coupled to the word line WL(n+1) to obtain second sample values S0 and S1, respectively. The second sample value S0 corresponds to third Vth range 1002 of FIG. 10A. The second sample value S1 corresponds to fourth Vth range 1004 of FIG. 10A.

In some implementations, when the read-voltage parameter Vread(1) of FIG. 10B is used to read memory cells 1302a and 1302b, a first read voltage Vread(1)_1 can be applied to the select word line WL(n) to read memory cell 1302a (e.g., Vread(1)=Vread(1)_1), since the second sample value of the adjacent memory cell 1306a is S0, corresponding to third Vth range 1002. Subsequently, a second read voltage Vread(1)_2 can be applied to the select word line WL(n) to read memory cell 1302b (e.g., Vread(1)=Vread(1)_2), since the second sample value of the adjacent memory cell 1306b is S1, corresponding to fourth Vth range 1004.

Next, when the read-voltage parameter Vread(2) of FIG. 10B is used to read memory cells 1302a and 1302b, a first read voltage Vread(2)_1 can be applied to the select word line WL(n) to read memory cell 1302a (e.g., Vread(2)=Vread(2)_1), since the second sample value of the adjacent memory cell 1306a is S0, corresponding to third Vth range 1002. Subsequently, a second read voltage Vread(2)_2 can be applied to the select word line WL(n) to read memory cell 1302b (e.g., Vread(2)=Vread(2)_2), since the second sample value of the adjacent memory cell 1306b is S1, corresponding to fourth Vth range 1004.

Subsequently, when the read-voltage parameter Vread(3) of FIG. 10B is used to read memory cells 1302a and 1302b, a first read voltage Vread(3)_1 can be applied to the select word line WL(n) to read memory cell 1302a (e.g., Vread (3)=Vread(3)_1), since the second sample value of the adjacent memory cell 1306a is S0, corresponding to third Vth range 1002. Subsequently, a second read voltage Vread (3)_2 can be applied to the select word line WL(n) to read memory cell 1302b (e.g., Vread(3)=Vread(3)_2), since the second sample value of the adjacent memory cell 1306b is S1, corresponding to fourth Vth range 1004.

In some implementations, when each one of the read-voltage parameters Vread(1), Vread(2), and Vread(3) of FIG. 10B is used to read memory cells 1302a and 1302b (e.g., with Vread(1)=Vread(1)_d), Vread(2)=Vread(2)_d, and Vread(3)=Vread(3)_d), at first, the first pass-through voltage Vpass'_1 can be applied to the adjacent word line WL(n−1) and/or the adjacent word line WL(n) during the reading of memory cell 1302a, since the second sample value of the adjacent memory cell 1306a is S0, corresponding to third Vth range 1002. Subsequently, the second pass-through voltage Vpass'_2 can also be applied to the adjacent word line WL(n−1) and/or the adjacent word line WL(n) during the reading of memory cell 1302b, since the second sample value of the adjacent memory cell 1306b is S1, corresponding to fourth Vth range 1004.

In some implementations, when each one of the read-voltage parameters Vread(1), Vread(2), and Vread(3) of FIG. 10B is used to read memory cells 1302a and 1302b (e.g., with Vread(1)=Vread(1)_d), Vread(2)=Vread(2)_d, and Vread(3)=Vread(3)_d), (a) the first bias level voltage Vbl'_1 can be applied to the bit line 1320a since the second sample value of the adjacent memory cell 1306a is S0, corresponding to third Vth range 1002, and simultaneously, (b) the second bias level voltage Vbl'_2 can be applied to the bit line 1320b since the second sample value of the adjacent memory cell 1306b is S1, corresponding to fourth Vth range 1004.

In some implementations, when each one of the read-voltage parameters Vread(1), Vread(2), and Vread(3) of FIG. 10B is used to read memory cells 1302a and 1302b (e.g., with Vread(1)=Vread(1)_d), Vread(2)=Vread(2)_d, and Vread(3)=Vread(3)_d), (a) the first SO development time Tso'_1 can be applied to the reading of memory cell 1302a since the second sample value of the adjacent memory cell 1306a is S0, corresponding to third Vth range 1002, and simultaneously, (b) the second SO development time Tso'_2 can be applied to the reading of memory cell 1302b since the second sample value of the adjacent memory cell 1306b is S1, corresponding to fourth Vth range 1004.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

What is claimed is:

1. A method of operating a memory device which comprises memory cells, the method comprising:
    programming a target memory cell coupled to a select word line;
    performing a first sample read on a first memory cell coupled to a first word line adjacent to the select word line to obtain a first sample value of the first memory cell;

configuring one or more verification parameters of the target memory cell based on the first sample value;
    verifying the target memory cell based on the one or more verification parameters;
    performing a second sample read on a second memory cell coupled to a second word line adjacent to the select word line to obtain a second sample value of the second memory cell; and
    configuring one or more read parameters of the target memory cell based on the second sample value.

2. The method of claim 1, wherein the first word line comprises a word line WL(n−1), the select word line comprises a word line WL(n), and the second word line comprises a word line WL(n+1), wherein n is an integer with n≥1.

3. The method of claim 1, wherein the first sample read is associated with a first set of threshold voltage (Vth) ranges, and the second sample read is associated with a second set of Vth ranges.

4. The method of claim 3, wherein the one or more verification parameters comprise at least one of a set of verification voltages, a first set of sensing node (SO) development times, a first set of pass-through voltages, or a first set of bias level voltages for biasing a voltage of a bit line coupled to the target memory cell.

5. The method of claim 4, wherein configuring the one or more verification parameters of the target memory cell based on the first sample value comprises:
    responsive to the first sample value corresponding to a first Vth range from the first set of Vth ranges, determining a first verification voltage for the target memory cell based on a target program state of the target memory cell; or
    responsive to the first sample value corresponding to a second Vth range from the first set of Vth ranges, determining a second verification voltage for the target memory cell based on the target program state of the target memory cell,
    wherein a first Vth value in the first Vth range is smaller than a second Vth value in the second Vth range, and a first offset of the first verification voltage relative to a default verification voltage associated with the target program state is greater than a second offset of the second verification voltage relative to the default verification voltage.

6. The method of claim 4, wherein configuring the one or more verification parameters of the target memory cell based on the first sample value further comprises:
    responsive to the first sample value corresponding to a first Vth range from the first set of Vth ranges, determining a first SO development time for the target memory cell; or
    responsive to the first sample value corresponding to a second Vth range from the first set of Vth ranges, determining a second SO development time for the target memory cell,
    wherein the first SO development time is greater than the second SO development time.

7. The method of claim 4, wherein configuring the one or more verification parameters of the target memory cell based on the first sample value further comprises:
    responsive to the first sample value corresponding to a first Vth range from the first set of Vth ranges, determining a first pass-through voltage for the target memory cell; or responsive to the first sample value corresponding to a second Vth range from the first set of Vth ranges, determining a second pass-through voltage for the target memory cell, wherein the first pass-through voltage is greater than the second pass-through voltage.

8. The method of claim 4, wherein configuring the one or more verification parameters of the target memory cell based on the first sample value further comprises:

responsive to the first sample value corresponding to a first Vth range from the first set of Vth ranges, determining a first bias level voltage for the target memory cell; or responsive to the first sample value corresponding to a second Vth range from the first set of Vth ranges, determining a second bias level voltage for the target memory cell, wherein the first bias level voltage is greater than the second bias level voltage.

9. The method of claim 3, wherein the one or more read parameters comprise at least one of a set of read voltages, a second set of sensing node (SO) development times, a second set of pass-through voltages, or a second set of bias level voltages for biasing a voltage of a bit line coupled to the target memory cell.

10. The method of claim 9, wherein configuring the one or more read parameters of the target memory cell based on the second sample value comprises:

responsive to the second sample value corresponding to a third Vth range from the second set of Vth ranges, determining a first subset of read voltages for the target memory cell; or responsive to the second sample value corresponding to a fourth Vth range from the second set of Vth ranges, determining a second subset of read voltages for the target memory cell, wherein a third Vth value in the third Vth range is smaller than a fourth Vth value in the fourth Vth range, and wherein for each read voltage in the first subset of read voltages, an offset of the read voltage relative to a respective default read voltage is smaller than an offset of a corresponding one in the second subset of read voltages relative to the respective default read voltage.

11. The method of claim 9, wherein configuring the one or more read parameters of the target memory cell based on the second sample value further comprises:

responsive to the second sample value corresponding to a third Vth range from the second set of Vth ranges, determining a third SO development time for the target memory cell; or responsive to the second sample value corresponding to a fourth Vth range from the second set of Vth ranges, determining a fourth SO development time for the target memory cell, wherein a third Vth value in the third Vth range is smaller than a fourth Vth value in the fourth Vth range, and the third SO development time is smaller than the fourth SO development time.

12. The method of claim 9, wherein configuring the one or more read parameters of the target memory cell based on the second sample value further comprises:

responsive to the second sample value corresponding to a third Vth range from the second set of Vth ranges, determining a third pass-through voltage for the target memory cell; or responsive to the second sample value corresponding to a fourth Vth range from the second set of Vth ranges, determining a fourth pass-through voltage for the target memory cell, wherein a third Vth value in the third Vth range is smaller than a fourth Vth value in the fourth Vth range, and the third pass-through voltage is smaller than the fourth pass-through voltage.

13. The method of claim 9, wherein configuring the one or more read parameters of the target memory cell based on the second sample value further comprises:

responsive to the second sample value corresponding to a third Vth range from the second set of Vth ranges, determining a third bias level voltage for the target memory cell; or responsive to the second sample value corresponding to a fourth Vth range from the second set of Vth ranges, determining a fourth bias level voltage for the target memory cell, wherein a third Vth value in the third Vth range is smaller than a fourth Vth value in the fourth Vth range, and the third bias level voltage is smaller than the fourth bias level voltage.

14. The method of claim 1, wherein the memory device comprises NAND Flash memory device.

15. The method of claim 1, wherein the target memory cell, the first memory cell, and the second memory cell are coupled to an identical bit line of the memory device.

16. A memory device, comprising:

memory cells comprising a first memory cell coupled to a first word line, a second memory cell coupled to a second word line, and a target memory cell coupled to a third word line which is adjacent to the first word line and the second word line; and a peripheral circuit coupled to the memory cells and configured to:

program the target memory cell;

perform a first sample read on the first memory cell to obtain a first sample value of the first memory cell;

configure one or more verification parameters of the target memory cell based on the first sample value;

verify the target memory cell based on the one or more verification parameters;

perform a second sample read on the second memory cell to obtain a second sample value of the second memory cell; and configure one or more read parameters of the target memory cell based on the second sample value.

17. The memory device of claim 16, wherein the one or more verification parameters comprise at least one of a set of verification voltages, a first set of sensing node (SO) development times, a first set of pass-through voltages, or a first set of bias level voltages for biasing a voltage of a bit line coupled to the target memory cell.

18. The memory device of claim 16, wherein the one or more read parameters comprise at least one of a set of read voltages, a second set of sensing node (SO) development times, a second set of pass-through voltages, or a second set of bias level voltages for biasing a voltage of a bit line coupled to the target memory cell.

19. The memory device of claim 16, wherein the target memory cell, the first memory cell, and the second memory cell are coupled to an identical bit line of the memory device.

20. A system, comprising:

a memory device configured to store data and comprising:

memory cells comprising a first memory cell coupled to a first word line, a second memory cell coupled to a second word line, and a target memory cell coupled to a third word line which is adjacent to the first word line and the second word line; and a peripheral circuit coupled to the memory cells and configured to:

program the target memory cell;

perform a first sample read on the first memory cell to obtain a first sample value of the first memory cell;

configure one or more verification parameters of the target memory cell based on the first sample value;

verify the target memory cell based on the one or more verification parameters;

perform a second sample read on the second memory cell to obtain a second sample value of the second memory cell; and configure one or more read parameters of the target memory cell based on the second sample value; and a memory controller coupled to the memory device and configured to control an operation of the memory device.

* * * * *